(12) United States Patent
Ohkubo et al.

(10) Patent No.: US 8,007,056 B2
(45) Date of Patent: Aug. 30, 2011

(54) BRAKE CONTROL APPARATUS AND CONTROL METHOD THEREOF

(75) Inventors: Masayasu Ohkubo, Okazaki (JP); Akihiro Otomo, Toyota (JP); Tsukasa Fukasawa, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1341 days.

(21) Appl. No.: 11/542,376

(22) Filed: Oct. 4, 2006

(65) Prior Publication Data

US 2007/0108837 A1 May 17, 2007

(30) Foreign Application Priority Data

Nov. 11, 2005 (JP) ................. 2005-327938

(51) Int. Cl.
*B60T 8/88* (2006.01)
*B60T 13/74* (2006.01)

(52) U.S. Cl. ............. 303/122.05; 303/122; 303/191; 303/DIG. 2

(58) Field of Classification Search ........ 303/3, 10, 303/11, 15, 122, 122.03, 122.04, 122.05, 303/122.09, 122.13, 122.14, 119.1, 191, 303/DIG. 1, DIG. 2
See application file for complete search history.

(56) References Cited

U.S. PATENT DOCUMENTS

2008/0084107 A1* 4/2008 Yanai et al. .............. 303/15
2009/0315391 A1* 12/2009 Tanaka et al. .............. 303/113.5

FOREIGN PATENT DOCUMENTS

| DE | 102 21 456 | 2/2003 |
|---|---|---|
| DE | 10 2005 014 097 A1 | 4/2006 |
| EP | 1 170 405 A1 | 1/2002 |
| EP | 1 347 083 A1 | 9/2003 |
| JP | 3-45455 | 2/1991 |
| JP | 11-115740 | 4/1999 |
| JP | 11115740 A | 4/1999 |
| JP | 2000-190841 | 7/2000 |
| JP | 2002-154419 | 5/2002 |
| WO | WO 91/14606 | 10/1991 |
| WO | WO 02/090159 A1 | 11/2002 |

OTHER PUBLICATIONS

Machine translation of JP-11115740.*
English translation of JP-11115740.*

* cited by examiner

*Primary Examiner* — Melody M Burch
(74) *Attorney, Agent, or Firm* — Oblon, Spivak, McClelland, Maier & Neustadt, L.L.P.

(57) ABSTRACT

A brake control apparatus has first and second wheel cylinders; a master cylinder unit; first and second systems; a separation valve; a pressure control mechanism that controls the working fluid pressure transferred to at least one of the first and second wheel cylinders independently of the brake operation, and a brake ECU. The brake ECU generates a differential pressure across the separation valve by operating the pressure control mechanism when there is no brake operation while a running drive source of a vehicle is stopped to determine whether the separation valve has a leakage abnormality.

15 Claims, 16 Drawing Sheets

BRAKE CONTROL APPARATUS AND CONTROL METHOD THEREOF

INCORPORATION BY REFERENCE

The disclosure of Japanese Patent Application No. 2005-327938 filed on Nov. 11, 2005 including the specification, drawings and abstract is incorporated herein by reference in its entirety.

BACKGROUND OF THE INVENTION

1. Field of the Invention

The invention relates to a brake control apparatus that controls the braking force applied to wheels provided on a vehicle, and a control method thereof.

2. Description of the Related Art

There has been a known brake hydraulic pressure control apparatus equipped with a separation valve that separates a hydraulic pressure circuit into a first system and a second system, and a pressure-intensifying linear control valve provided between the separation valve and a master cylinder in the first or second system (e.g., Japanese Patent Application Publication No. JP-A-Hei-11-115740). In this brake hydraulic pressure control apparatus, when the brake pedal is depressed after the ignition switch has been turned on, a differential pressure corresponding to the relief pressure of the pressure-intensifying linear control valve occurs across the separation valve. On the basis of a change in the differential pressure, leakage of the separation valve is detected. According to this brake hydraulic pressure control apparatus, the leakage failure of the separation valve can be accurately detected.

In vehicles equipped with electric motors as running drive source, such as hybrid vehicles, electric vehicles, etc., a so-called regeneration cooperative control is sometimes performed in which during braking, a requested braking force is generated by using the braking force based on the regeneration and the braking force based on hydraulic pressure in combination. Through the regeneration cooperative control, a part of the kinetic energy occurring during the running of the vehicle is recovered as electric energy during braking. Therefore, the regeneration cooperative control is a factor for improving the fuel economy of a vehicle. In order to further improve fuel economy, it is desirable to begin the regeneration cooperative control promptly after the running drive source of the vehicle is started up.

In the regeneration cooperative control, the hydraulic pressure transferred to the wheel cylinder of each wheel by a brake control apparatus is not a hydraulic pressure pressurized in accordance with the amount of operation of a brake operating member, but is a hydraulic pressure adjusted taking into consideration the braking force provided by the regeneration. If an abnormality is detected on the mechanism that adjusts the hydraulic pressure, the regeneration cooperative control stops, and the hydraulic pressure pressurized by a manual hydraulic pressure source, such as a master cylinder or the like, in accordance with the amount of brake operation is transferred to the wheel cylinder of each wheel, without being adjusted. In such a case, the hydraulic pressure transfer circuit from the manual hydraulic pressure source to each wheel cylinder is constructed so as to be separable into two systems by a separation valve. Therefore, if another failure occurs, for example, if piping in one of the two systems is leaking, the operational system is separated from the failed system by the separation valve, and the operational system may be used to generate braking force. Thus, a construction capable of generating braking force even if two failures concurrently exist is preferable in the light of fail-safe design.

In order to further promote safety, it is desirable that the apparatus be capable of detecting whether or not the separation valve can normally separate the systems, that is, the apparatus be capable of detecting whether or not the separation valve itself has a leak. Although the above-described brake hydraulic pressure control apparatus is capable of detecting any leaks in the separation valve, this capability of the apparatus is based on the precondition that a hydraulic pressure circuit in which a differential pressure is generated across the separation valve is adopted.

However, there are cases where adoption of a different hydraulic pressure circuit construction is desirable in order to improve the controllability of the wheel cylinders, the operability for drivers, etc. Furthermore, as stated above, to improve the fuel economy, it is desirable to begin the regeneration cooperative control promptly after the running drive source of the vehicle starts up. However, in the light of fail-safe design, it is desirable to verify the absence of leaks in the separation valve before beginning the regeneration cooperative control.

SUMMARY OF THE INVENTION

The invention provides a brake control apparatus that executes the regeneration cooperative control promptly after the startup of the running drive source by detecting whether or not the separation valve has a leakage abnormality before the startup of the running drive source of the vehicle.

A brake control apparatus according to a first aspect of the invention comprises: a first wheel cylinder that applies braking force to a first wheel; a second wheel cylinder that applies the braking force to a second wheel, which is different from the first wheel; a manual hydraulic pressure source that pressurizes a working fluid in accordance with an amount of operation of a brake operating member; a first system that communicably connects the manual hydraulic pressure source and the first wheel cylinder, and that transfers working fluid pressure in the manual hydraulic pressure source to the first wheel cylinder; a second system that communicably connects the manual hydraulic pressure source and the second wheel cylinder, and that transfers the working fluid pressure in the manual hydraulic pressure source to the second wheel cylinder; a main channel that communicably connects the first system and the second system; a separation valve provided in a main channel; a pressure control mechanism that controls the working fluid pressure transferred to at least one of the first wheel cylinder and the second wheel cylinder independently of the amount of operation of the brake operating member; and a control device that actuates the pressure control mechanism when the brake operating member is not operated and the separation valve is closed when the running drive source of the vehicle is stopped, and that determines whether or not the separation valve has an abnormality based on changes in the pressure difference between an upstream side and a downstream side of the separation valve.

According to this aspect, the brake control apparatus controls the working fluid pressure in the wheel cylinders by operation of at least one of the manual hydraulic pressure source and the pressure control mechanism. Hence, for example, when the regeneration cooperative control is executed, the wheel cylinder pressure is controlled by the pressure control mechanism. In the case where the regeneration cooperative control is not executed, the working fluid pressure in the manual hydraulic pressure source is transferred to the wheel cylinders via the first system and the second system. Then, by opening or closing the separation valve, the passage of the working fluid between the first system and the second system is permitted or blocked.

By actuating the pressure control mechanism, the control device generates a pressure difference between the upstream side and the downstream side of with the separation valve closed, and determines whether or not the separation valve has an abnormality on the basis of a change in the pressure difference. This abnormality determination is performed when the running drive source of the vehicle and no operation is performed on the brake-operating member. Hence, the presence/absence of an abnormality of the separation valve is determined before the running drive source of the vehicle is started. If abnormality is not detected, the regeneration cooperative control can be executed promptly after the startup of the running drive source. Furthermore, since the presence/absence of an abnormality is determined by operating the control device when the driver is not operating the brake, the driver does not perceive the change in the pedal feel associated with the determination.

In this apparatus, the control device may determine whether or not the separation valve has an abnormality, when the control device receives a signal indicating the entry of an occupant into the vehicle. Therefore, the presence/absence of an abnormality of the separation valve is determined when a signal related to the presence/entry of an occupant into the vehicle, for example, a signal output due to a predetermined operation performed prior to the startup of the running drive source, is input to the control device. The ride-related signal is output upon detection of a predetermined operation performed by an occupant in relation to the vehicle during a period from the occupant's approach to the vehicle till the startup of the running drive source after the occupant enters the vehicle. Ordinarily, the occupant's predetermined operation is performed before the running drive source is started up. Hence, the presence/absence of abnormality is determined immediately prior to the startup of the running drive source, and the latest determination result can be acquired. Therefore, it becomes possible to more reliably judge the capability of the execution of the regeneration cooperative control after the startup.

The pressure control mechanism may include a power hydraulic pressure source that delivers the pressurized working fluid, when supplied with power, independently of operation of the brake operating member, a pressure-intensifying control valve provided downstream of the power hydraulic pressure source, and a pressure-reducing control valve provided downstream of the pressure-intensifying control valve. The main channel may be communicably connected between the pressure-intensifying control valve and the pressure-reducing control valve.

Therefore, in association with the actuation of the pressure-intensifying control valve, the working fluid is supplied to at least one of the first system and the second system from the power hydraulic pressure source via the main channel. In association with the actuation of the pressure-reducing control valve, the working fluid is discharged from at least one of the first system and the second system via the main channel. Thus, by controlling the supply/discharge of the working fluid with respect to the first system or the second system, the pressure control mechanism is able to control the wheel cylinder pressure. Furthermore, if the separation valve is closed, the first system and the second system are shut off from each other, so that the pressure control mechanism controls the supply/discharge of the working fluid with respect to one of the first system and the second system. Hence, a pressure difference can be generated between the upstream side and the downstream side of the separation valve, when the separation valve is closed.

Furthermore, the control device, before determining whether or not the separation valve has an abnormality, may determine whether or not the pressure difference between the upstream side and the downstream side of the separation valve is normally generated. According to this aspect, before the determination as to the presence/absence of an abnormality of the separation valve, it is determined whether or not the pressure difference for the abnormality detection is normally generated. This makes it possible to detect a factor other than the abnormality of the separation valve that can vary the pressure difference between the upstream side and the downstream side of the separation valve, prior to the abnormality determination regarding the separation valve. Hence, the possibility of confusing the abnormality of the separation valve with other abnormalities is reduced, and it is possible to more reliably determine an abnormality of the separation valve.

In this case, the control device may determine whether the pressure difference is normally generated based on a response of the working fluid pressure on the separation valve caused when a predetermined pressure is applied to the separation valve by operating the pressure control mechanism. Therefore, it can easily be determined whether or not the pressure difference for the abnormality determination regarding the separation valve is normally generated by applying the predetermined pressure to the separation valve.

Furthermore, the control device may generate the pressure difference between the upstream side and the downstream side of the separation valve by applying the predetermined pressure to an open separation valve, then closing the separation, and operating pressure control mechanism to intensify pressure on one of the upstream side and the downstream side of the separation valve.

In the case where the working fluid pressure is intensified from the level of the atmospheric pressure by operating the pressure control mechanism, the working hydraulic pressure less easily increases for the amount of fluid consumed during an initial period of the pressure intensification, due to the influence of the elasticities of the piping, the wheel cylinders, etc. Then, after the hydraulic pressure is intensified to some extent, the variation in the working hydraulic pressure, even for small changes in the amount of fuel consumed, increases during the initial period of the pressure intensification. Hence, if a predetermined pressure is first applied to the separation valve and then the pressure on one side of the separation valve is intensified to generate the pressure difference for the determination as in the foregoing aspect, the variation in the pressure difference associated with the passage of the working fluid due to the abnormality in the separation valve becomes greater. Therefore, it becomes possible to determine an abnormality in the separation valve with higher accuracy.

The brake control apparatus may further comprise a pressure sensor that measures the working fluid pressure in the main channel, and it is permissible that the first system include a first cut valve provided between the manual hydraulic pressure source and the main channel, and that the second system include a second cut valve provided between the manual hydraulic pressure source and the main channel, and that the control device closes the first and second cut valves and opens the separation valve, and operate the pressure-intensifying control valve to supply the working fluid to the main channel, and determine whether any one of the first cut valve, the second cut valve, the pressure-intensifying control valve, and pressure-reducing control valve has an abnormality based on the working fluid pressure in the main channel measured by the pressure sensor.

According to this aspect, as the first and second cut valves are closed, the main channel is shut off from the manual hydraulic pressure source. The main channel is supplied with the working fluid from the power hydraulic pressure source via the pressure-intensifying control valve so that the hydraulic pressure is intensified toward a predetermined pressure. On the basis of the then-occurring working fluid pressure in the main channel, it is determined whether or not any one of the first cut valve, the second cut valve, the pressure-intensifying control valve, and the pressure-reducing control valve has an abnormality. Thus, it becomes possible to perform abnormality determination with respect to an increased number of elements before the startup of the vehicle.

Furthermore, the control device may close the first cut valve, the second cut valve, and the separation valve, and may operate the pressure control mechanism to generate the pressure difference between the upstream side and the downstream side of the separation valve, and may determine whether or not the separation valve has an abnormality based on the working fluid pressure in the main channel measured by the pressure sensor.

According to this aspect, the first cut valve, the second cut valve, and the separation valve are closed. As a result, one of the first wheel cylinder and the second wheel cylinder is shut off from both the manual hydraulic pressure source and the pressure control mechanism. The other wheel cylinder is shut off from the manual hydraulic pressure source, while the inflow of the working fluid to the wheel cylinder from the pressure control mechanism is permitted. Hence, it becomes possible to generate a pressure difference between the upstream side and the downstream side of the separation valve by operating the pressure control mechanism in order to perform abnormality determination regarding the separation valve. Furthermore, the first and second wheel cylinders are shut off from the manual hydraulic pressure source by the first and second cut valves, respectively. This is preferable in that if a brake operation is performed during the abnormality determination prior to the startup of the vehicle, unpleasant feel is not provided.

In this case, the control device may eliminate the pressure difference after abnormality determination regarding the separation valve, and may open at least one of the first cut valve and the second cut valve after the pressure difference is eliminated. According to this aspect, after the pressure difference between the upstream side and the downstream side of the separation valve is eliminated and the pressures on the two sides become equal, at least one of the first cut valve and the second cut valve is opened. As the pressure difference between the upstream side and the downstream side of the separation valve is eliminated, the pressure difference between the upstream side and the downstream side of the cut valve or valves becomes smaller, so that the return of the working fluid to the manual hydraulic pressure source in association with the opening of the cut valve is curbed. Thus, the pedal shock at the time of opening the cut valve or valves can be reduced.

Furthermore, the control device may determine whether or not the working fluid pressure in accordance with the amount of operation of the brake operating member is transferred to the first and second wheel cylinders, before the vehicle begins to run. If an abnormality is detected during the execution of the regeneration cooperative control while the vehicle is running, the regeneration cooperative control may be stopped so that the working fluid pressure in accordance with the amount of brake operation of the driver will be transferred to the wheel cylinders. Hence, according to this aspect, it is determined whether or not braking force can be normally generated should an abnormality occur, before the vehicle begins to run, that is, before the regeneration cooperative control is executed. Therefore, safety can be further promoted.

This brake control apparatus may further comprise a first pressure sensor that measures the working fluid pressure in the main channel, a second pressure sensor that measures the working fluid pressure in the manual hydraulic pressure source, and a brake operation amount sensor that measures the amount of operation of the brake operating member, and it is permissible that the first system include a first cut valve provided between the manual hydraulic pressure source and the main channel, and that the second system include a second cut valve provided between the manual hydraulic pressure source and the main channel, and that the control device close the second cut valve, and open the first cut valve and the separation valve, and acquire measured values from the first pressure sensor, the second pressure sensor, and the brake operation amount sensor, and determine whether or not the working fluid pressure in accordance with the amount of operation of the brake operating member is normally transferred to the first and second wheel cylinders based on the measured values.

According to this aspect, while an operation is being performed on the brake operating member, the second cut valve is closed, and the first cut valve and the separation valve are opened. As a result, equal working fluid pressures act on the first pressure sensor and the second pressure sensor. Consequently, the accuracy in determining whether or not any one of the sensors has an abnormality on the basis of measured values of the sensors can be improved. Therefore, this determination can be performed with a higher accuracy than the determination as to whether the wheel cylinder pressure in accordance with the amount of brake operation is generated.

Furthermore, the control device may determine whether or not at least one of the first pressure sensor, the second pressure sensor, and the brake operation amount sensor has an abnormality based on the measured values. In this manner, the abnormality determination regarding the sensors is also performed, so that the determination as to whether the wheel cylinder pressure in accordance with the amount of brake operation is generated can be performed with higher accuracy.

Furthermore, the control device may determine whether or not the separation valve has a leakage abnormality based on a change in the pressure difference between the upstream side and the downstream side of the separation valve.

A second aspect of the invention relates to a brake control method of a brake control apparatus including a separation valve provided in a main channel connecting in communication a first system that transfers working fluid pressure from a manual hydraulic pressure source that pressurizes a working fluid in accordance with an amount of operation of a brake operating member, to a first wheel cylinder provided for applying braking force to a first wheel, and a second system that transfers the working fluid pressure from the manual hydraulic pressure source to a second wheel cylinder provided for applying the braking force to a second wheel. The brake control method comprises the steps of: closing the separation valve; and operating a pressure control mechanism when the brake operating member is not operated during a stop of a running drive source of a vehicle, and determining whether or not the separation valve has an abnormality based on a change in pressure difference between an upstream side and a downstream side of the separation valve.

According to the invention, it becomes possible to execute the regeneration cooperative control promptly after the running drive source of the vehicle is started up.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Hereinafter, best modes for carrying out the invention will be described in detail with reference to the drawings.

Figure 1:
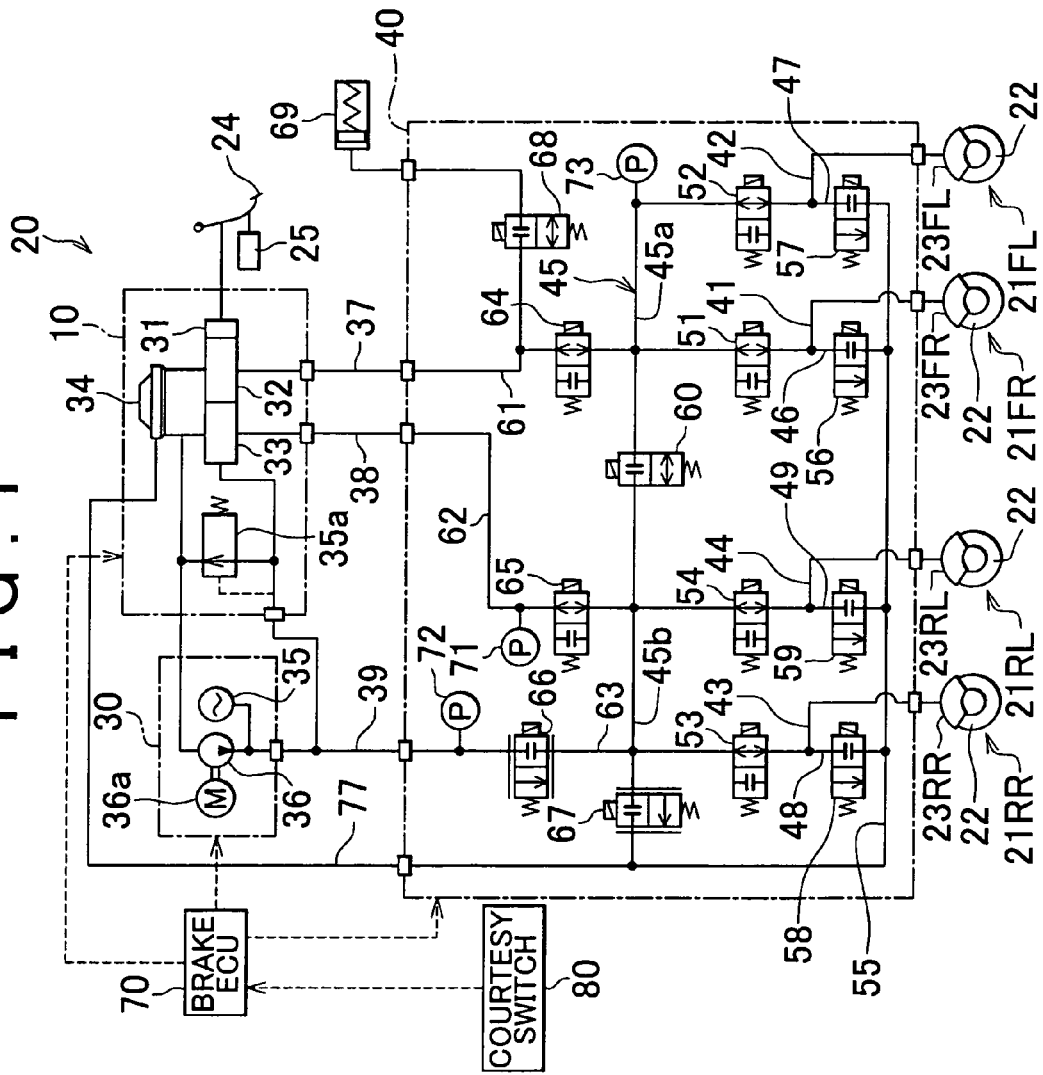
FIG. 1 is a system diagram showing a brake control apparatus in accordance with an embodiment of the invention.

FIG. 1 is a system diagram showing a brake control apparatus 20 in accordance with an embodiment of the invention. The brake control apparatus 20 shown in this drawing constitutes a vehicular electronic control brake system (ECB), and controls the braking force applied to four wheels provided on a vehicle. The brake control apparatus 20 in accordance with this embodiment may be installed in, for example, a hybrid vehicle equipped with an electric motor and an internal combustion engine as running drive sources. In such a hybrid vehicle, the regenerative braking that brakes the vehicle by converting kinetic energy of the vehicle into electric energy, and the hydraulic braking by the brake control apparatus 20 can each be used to brake of the vehicle. The vehicle in this embodiment may execute a brake regeneration cooperative control to generate the desired braking force by using the regenerative braking and the hydraulic braking in combination.

The brake control apparatus 20, as shown in FIG. 1, includes disc brake units 21FR, 21FL, 21RR, 21RL as braking force application mechanisms provided individually for the wheels (not shown), a master cylinder unit 10, a power hydraulic pressure source 30, and a hydraulic pressure actuator 40.

The disc brake units 21FR, 21FL, 21RR, 21RL apply braking force to the front right wheel, the front left wheel, the rear right wheel, and the rear left wheel, respectively. The master cylinder unit 10 as a manual hydraulic pressure source delivers brake fluid, pressurized in accordance with the amount of operation performed by a driver on a brake pedal 24, to the disc brake units 21FR to 21RL. When supplied with power, the power hydraulic pressure source 30 pressurizes and delivers the brake fluid as a working fluid to the disc brake units 21FR to 21RL independently of the driver's operation of brake pedal 24. The hydraulic pressure actuator 40 appropriately adjusts the hydraulic pressure of the brake fluid supplied from the power hydraulic pressure source 30 or the master cylinder unit 10, and delivers it to the disc brake units 21FR to 21RL. Thus, the braking force applied to each wheel by the hydraulic braking is adjusted. In this embodiment, the power hydraulic pressure source 30 and the hydraulic pressure actuator 40 constitute a wheel cylinder pressure control system.

The disc brake units 21FR to 21RL, the master cylinder unit 10, the power hydraulic pressure source 30, and the hydraulic pressure actuator 40 will be individually described further in detail below. Each of the disc brake units 21FR to 21RL includes a brake disc 22, and a wheel cylinder 23FR to 23RL that is contained in a brake caliper. The wheel cylinders 23FR to 23RL are respectively connected to the hydraulic pressure actuator 40 via different fluid passageways. Hereinafter, the wheel cylinders 23FR to 23RL will be collectively referred to as "wheel cylinders 23" below, where appropriate.

In each disc brake unit 21FR to 21RL, when brake fluid is supplied from the hydraulic pressure actuator 40 to the wheel cylinder 23, a friction member, such as a brake pad, is pressed against the brake disc 22 that rotates together with a corresponding one of the wheels. Thus, braking force is applied to each wheel. Although this embodiment uses the disc brake units 21FR to 21RL it is also permissible to use other braking force applying mechanisms which each include a wheel cylinder 23, for example, a drum brake or the like.

The master cylinder unit 10 in this embodiment is a hydraulic pressure booster-equipped master cylinder, and includes a hydraulic pressure booster 31, a master cylinder 32, a regulator 33, and a reservoir 34. The hydraulic pressure booster 31 is linked to the brake pedal 24, and amplifies the pedal depression force applied to the brake pedal 24, and transfers it to the master cylinder 32. The pedal depression force is amplified as the brake fluid is supplied from the power hydraulic pressure source 30 to the hydraulic pressure booster 31 via the regulator 33. Then, the master cylinder 32 generates a master cylinder pressure that has a predetermined servo ratio with respect to the pedal depressing force.

The brake fluid reservoir 34 is disposed on top of the master cylinder 32 and the regulator 33. The master cylinder 32 becomes connected in communication with the reservoir 34 when the brake pedal 24 is not depressed. On the other hand, the regulator 33 is connected in communication with both the reservoir 34 and an accumulator 35 of the power hydraulic pressure source 30. Using the reservoir 34 as a low-pressure source and the accumulator 35 as a high-pressure source, the regulator 33 generates a hydraulic pressure substantially equal to the master cylinder pressure. The hydraulic pressure of the regulator 33 will be referred to as "regulator pressure" below, where appropriate.

The power hydraulic pressure source 30 includes the accumulator 35 and a pump 36. The accumulator 35 converts the pressure energy of the brake fluid pressurized by the pump 36 into the pressure energy of a filler gas, such as nitrogen or the like, for example, of about 14 to 22 MPa, and stores the converted pressure. The pump 36 has a motor 36a as a drive source. A suction opening of the pump 36 is connected to the reservoir 34 while an ejection opening thereof is connected to the accumulator 35. The accumulator 35 is also connected to a relief valve 35a that is provided in the master cylinder unit 10. If the pressure of the brake fluid in the accumulator 35 abnormally rises to, for example, about 25 MPa, the relief valve 35a opens, so that the high-pressure brake fluid returns to the reservoir 34.

As described above, the brake control apparatus 20 has the master cylinder 32, the regulator 33 and the accumulator 35 as sources of supplying the brake fluid to the wheel cylinders 23. A master piping 37 is connected to the master cylinder 32. Likewise, a regulator piping 38 is connected to the regulator 33, and an accumulator piping 39 is connected to the accumulator 35. The master piping 37, the regulator piping 38 and the accumulator piping 39 are connected to the hydraulic pressure actuator 40.

The hydraulic pressure actuator 40 includes an actuator block in which a plurality of channels are formed, and a plurality of electromagnetic control valves. The channels formed in the actuator block include individual channels 41, 42, 43, 44, and a main channel 45. The individual channels 41 to 44 branch from the main channel 45, and are connected to the wheel cylinders 23FR, 23FL, 23RR, 23RL of the disc brake units 21FR, 21FL, 21RR, 21RL, respectively. Thus, each wheel cylinder 23 is connectable in communication with the main channel 45.

An intermediate portion of each of the individual channels 41, 42, 43, 44 is provided with an ABS retention valve 51, 52, 53, 54. Each of the ABS retention valves 51 to 54 has a solenoid that is on/off controlled, and a spring, and is a normally open type electromagnetic control valve that is open when the solenoid is in a non-electrified state. When open each ABS retention valve 51 to 54 allows the brake fluid to pass in either direction. That is, the brake fluid can freely flow between the main channel 45 and the wheel cylinders 23. When an ABS retention valve 51 to 54 is closed by electrifying the solenoid thereof, the passage of brake fluid in the corresponding channels 41 to 44 is interrupted.

Furthermore, the wheel cylinders 23 are connected to a reservoir channel 55 via pressure reducing channels 46, 47, 48, 49 that are connected to the individual channels 41 to 44, respectively. An intermediate portion of each of the pressure reducing channels 46, 47, 48, 49 is provided with an ABS pressure reducing valve 56, 57, 58, 59. Each of the ABS pressure reducing valves 56 to 59 has a solenoid that is on/off controlled, and a spring, and is a normally closed type electromagnetic valve that is closed while the solenoid is in a non-electrified state. When an ABS pressure reducing valve 56-59 is closed, the passage of brake fluid through the corresponding pressure reducing channel 46-49 is interrupted. When the ABS pressure reducing valve 56 to 59 is opened, by electrifying the solenoid thereof, brake fluid may pass through the corresponding pressure reducing channel 46-49, so that the brake fluid returns from the corresponding one of the wheel cylinders 23 to the reservoir 34 via the one of the pressure reducing channels 46 to 49 and the reservoir channel 55. Incidentally, the reservoir channel 55 is connected to the reservoir 34 of the master cylinder unit 10 via a reservoir piping 77.

An intermediate portion of the main channel 45 has a separation valve 60. Due to the separation valve 60, the main channel 45 is divided into a first channel 45a connected to the individual channels 41, 42, and a second channel 45b connected to the individual channels 43, 44. The first channel 45a is connected to the wheel cylinders 23FR, 23FL on the front wheel side via the individual channels 41, 42. The second channel 45b is connected to the wheel cylinders 23RR, 23RL on the rear wheel side via the individual channels 43, 44.

The separation valve 60 has a solenoid that is on/off controlled, and a spring, and is a normally closed type electromagnetic control valve that is closed when the solenoid is in a non-electrified state. When the separation valve 60 is closed, the passage of brake fluid in the main channel 45 is interrupted. When the separation valve 60 is opened, by electrifying the solenoid thereof, brake fluid can pass in either direction between the first channel 45a and the second channel 45b.

In the hydraulic pressure actuator 40, a master channel 61 and a regulator channel 62 connected in communication with the main channel 45 are formed. More specifically, the master channel 61 is connected to the first channel 45a of the main channel 45, and the regulator channel 62 is connected to the second channel 45b of the main channel 45. Furthermore, the master channel 61 is connected to the master piping 37 that is connected in communication with the master cylinder 32. The regulator channel 62 is connected to the regulator piping 38 that is connected in communication with the regulator 33.

An intermediate portion of the master channel 61 has a master cut valve 64. The master cut valve 64 has a solenoid that is on/off controlled, and a spring, and is a normally open type electromagnetic control valve that is open when the solenoid is in the non-electrified state. When the master cut valve 64 is open brake fluid is allowed to pass in either direction between the master cylinder 32 and the first channel 45a of the main channel 45. When the master cut valve 64 is closed, by electrifying the solenoid, the passage of brake fluid in the master channel 61 is interrupted.

A stroke simulator 69 is connected to the master channel 61 on the upstream side of the master cut valve 64, via a simulator cut valve 68. That is, the simulator cut valve 68 is provided in a channel that connects the master cylinder 32 and the stroke simulator 69. The simulator cut valve 68 has a solenoid that is on/off controlled, and a spring, and is normally closed type electromagnetic control valve that is closed when the solenoid is in the non-electrified state. When the simulator cut valve 68 is closed, the passage of brake fluid between the master channel 61 and the stroke simulator 69 is interrupted. When the simulator cut valve 68 is opened, by electrifying the solenoid, the brake fluid can pass in either direction between the master cylinder 32 and the stroke simulator 69.

The stroke simulator 69 includes pistons and springs, and creates reaction force that proportional to the driver's depression force on the brake pedal 24 when the simulator cut valve 68 is open. The stroke simulator 69 may have a multi-stepped spring characteristic for improving the driver's brake operation feeling. The stroke simulator 69 in this embodiment has a multi-stepped spring characteristic.

An intermediate portion of the regulator channel 62 has a regulator cut valve 65. The regulator cut valve 65 also has a solenoid that is on/off controlled, and a spring, and is a normally open type electromagnetic control valve that is open when the solenoid is in the non-electrified state. When the regulator cut valve 65 is open, brake fluid may pass in either direction between the regulator 33 and the second channel 45b of the main channel 45. When the regulator cut valve 65 is closed, by electrifying the solenoid, the passage of brake fluid in the regulator channel 62 is interrupted.

In this embodiment, as described above, the master cylinder 32 of the master cylinder unit 10 is connected in communication with the wheel cylinders 23FR, 23FL on the front wheel side, by a first system that includes the following elements. That is, the first system includes the master piping 37, the master channel 61, the master cut valve 64, the first channel 45a of the main channel 45, the individual channels 41, 42, and the ABS retention valves 51, 52. The hydraulic pressure booster 31 and the regulator 33 of the master cylinder unit 10 are connected in communication with the wheel cylinders 23RR, 23RL on the rear wheel side, by a second system that includes the following elements. That is, the second system includes the regulator piping 38, the regulator channel 62, the regulator cut valve 65, the second channel 45b of the main channel 45, the individual channels 43, 44, and the ABS retention valves 53, 54.

Therefore, the hydraulic pressure in the master cylinder unit 10, pressurized in accordance with the amount of brake operation performed by the driver, is transferred to the front wheel-side wheel cylinders 23FR, 23FL via the first system. The hydraulic pressure in the master cylinder unit 10 is also transferred to the rear wheel-side wheel cylinders 23RR, 23RL via the second system. Thus, the braking force, in accordance with the amount of brake operation of the driver, can be generated by each wheel cylinder 23.

In the hydraulic pressure actuator 40, an accumulator channel 63 is also formed in addition to the master channel 61 and the regulator channel 62. An end of the accumulator channel 63 is connected to the second channel 45b of the main channel 45, and another end thereof is connected to the accumulator piping 39 that is connected in communication with the accumulator 35.

An intermediate portion of the accumulator channel 63 has a pressure intensifying linear control valve 66. Furthermore, the accumulator channel 63, and the second channel 45b of the main channel 45 are connected to the reservoir channel 55 via a pressure reducing linear control valve 67. Each of the pressure intensifying linear control valve 66 and the pressure reducing linear control valve 67 has a linear solenoid, and a spring, and is a normally closed type electromagnetic control valve. In each of the pressure intensifying linear control valve 66 and the pressure reducing linear control valve 67, the valve opening degree is adjusted in proportion to the electric current supplied to the solenoid thereof.

The pressure intensifying linear control valve 66 is provided as a common pressuring intensifying control valve for the plurality of wheel cylinders 23 that are provided corresponding to the wheels. Likewise, the pressure reducing linear control valve 67 is provided as a common pressure reducing control valve for the wheel cylinders 23. That is, in this embodiment, the pressure intensifying linear control valve 66 and the pressure reducing linear control valve 67 are provided as a pair of common control valves for the wheel cylinders 23 which control the supply and discharge of the working fluid delivered from the power hydraulic pressure source 30, with respect to the wheel cylinders 23.

Incidentally, the differential pressure between the outlet and inlet openings of the pressure intensifying linear control valve 66 corresponds to the pressure difference between the pressure of brake fluid in the accumulator 35 and the pressure of brake fluid in the main channel 45. The differential pressure between the outlet and inlet openings of the pressure reducing linear control valve 67 corresponds to the pressure difference between the pressure of brake fluid in the main channel 45 and the pressure of brake fluid in the reservoir 34. Furthermore, a relationship of F1+F3=F2 holds where F1 is the electromagnetic drive force that is in accordance with the electric power supplied to the linear solenoid of the pressure intensifying linear control valve 66 or of the pressure reducing linear control valve 67, and F2 is the elastic force of the spring thereof, and F3 is a differential pressure action force that is in accordance with the differential pressure between the outlet and inlet openings of the pressure intensifying linear control valve 66 or of the pressure reducing linear control valve 67. Therefore, by continuously controlling the electric power supplied to the linear solenoids of the pressure intensifying linear control valve 66 and the pressure reducing linear control valve 67, the differential pressures between the outlet and inlet openings of the pressure intensifying linear control valve 66 and the pressure reducing linear control valve 67 can be controlled.

In this embodiment, the power hydraulic pressure source 30, the pressure intensifying linear control valve 66, and the pressure reducing linear control valve 67 constitute a pressure control mechanism. By operating the pressure control mechanism, the hydraulic pressure of the wheel cylinders 23 is controlled. Since the second channel 45b of the main channel 45 is connected in communication between the pressure intensifying linear control valve 66 and the pressure reducing linear control valve 67, the pressure control mechanism can control the hydraulic pressure of the rear wheel cylinders 23RR, 23RL regardless of the opening/closure of the separation valve 60. If the separation valve 60 is open, the hydraulic pressure of each wheel cylinder 23 can be controlled by operating the pressure control mechanism.

In the brake control apparatus 20, the power hydraulic pressure source 30 and the hydraulic pressure actuator 40 are controlled by a brake ECU 70. The brake ECU 70 is constructed as a microprocessor that includes a CPU. In addition to the CPU, the brake ECU 70 further includes read-only memory (ROM) that stores various programs, random-access memory (RAM) for temporarily storing data, input/output ports, communication ports, etc. The brake ECU 70 communicates with at least a hybrid ECU (not shown) that is superior the brake ECU 70. On the basis of control signals from the hybrid ECU and signals from various sensors, the brake ECU 70 executes the brake regeneration cooperative control by controlling the pump 36 of the power hydraulic pressure source 30, and the electromagnetic control valves 51 to 54, 56 to 59, 60, 64 to 68 that constitute the hydraulic pressure actuator 40.

A regulator pressure sensor 71, an accumulator pressure sensor 72 and a control pressure sensor 73 are connected to the brake ECU 70. The regulator pressure sensor 71 detects the pressure of brake fluid in the regulator channel 62 upstream of the regulator cut valve 65, that is, the regulator pressure, and gives a signal indicating the detected value, to the brake ECU 70. The accumulator pressure sensor 72 detects the pressure of brake fluid in the accumulator channel 63 upstream of the pressure intensifying linear control valve 66, and gives a signal indicating the detected value, to the brake ECU 70. The control pressure sensor 73 detects the pressure of brake fluid in the first channel 45a of the main channel 45, and gives a signal indicating the detected value, to the brake ECU 70. The detected values of the pressure sensors 71 to 73 are sequentially given to the brake ECU 70 at predetermined intervals, and are sequentially stored in predetermined storage areas in the brake ECU 70. Incidentally, in this embodiment, the pressure sensors 71 to 73 have a self-diagnostic function. That is, each of the sensors can detect the presence/absence of an abnormality within the sensor, and to transmit a signal indicating the presence/absence of an abnormality to the brake ECU 70.

In the case where the separation valve 60 is open and the first channel 45a and the second channel 45b of the main channel 45 are connected in communication with each other, the output value of the control pressure sensor 73 indicates the hydraulic pressure on the low-pressure side of the pressure intensifying linear control valve 66, and also indicates the hydraulic pressure on the high-pressure side of the pressure reducing linear control valve 67. Therefore, the output value thereof can be used for the control of the pressure intensifying linear control valve 66 and the pressure reducing linear control valve 67. In the case where the pressure intensifying linear control valve 66 and the pressure reducing linear control valve 67 are closed and where the master cut valve 64 is open, the output value of the control pressure sensor 73 indicates the master cylinder pressure. Furthermore, in the case where the separation valve 60 is open, so that the first channel 45a and the second channel 45b of the main channel 45 are connected in communication with each other, and where the ABS retention valves 51 to 54 are open while the ABS pressure reducing valves 56 to 59 are closed, the output value of the control pressure sensor 73 indicates the working fluid pressure that acts on each wheel cylinder 23, that is, the wheel cylinder pressure.

Furthermore, the sensors connected to the brake ECU 70 also include a stroke sensor 25 that is provided for the brake pedal 24. The stroke sensor 25 detects the pedal stroke as the amount of operation of the brake pedal 24, and gives a signal indicating the detected value, to the brake ECU 70. The output value of the stroke sensor 25 is also sequentially given to the brake ECU 70 at predetermined time intervals, and is sequentially stored in a predetermined area in the brake ECU 70. A brake operation state detection means other than the stroke sensor 25 may also be provided and connected to the brake ECU 70, in addition to the stroke sensor 25 or in place of the stroke sensor 25. Examples of the brake operation state detection means include a pedal depression force sensor that detects the operation force on the brake pedal 24, a brake switch that detects that the brake pedal 24 has been depressed, etc.

Furthermore, in this embodiment, a courtesy switch 80 that detects the opening/closure of a door of the vehicle is connected to the brake ECU 70. When the door of the vehicle is opened or closed by an occupant, an output signal of the courtesy switch 80 is input to the brake ECU 70.

The brake control apparatus 20 constructed as described above is able to take at least three control states: a regeneration cooperative control mode, a Reg increase mode, and a hydrobooster mode. During ordinary running of the vehicle, the brake control apparatus 20 controls the braking force in the regeneration cooperative control mode. For example, in the case where the assay of each sensor is to be preformed during a stop of the vehicle, or the like, the brake control apparatus 20 controls the braking force in the Reg increase mode. If an abnormality is detected in the brake control apparatus 20, the brake control apparatus 20 controls the braking force in the hydrobooster mode. During the hydrobooster mode, the hydraulic pressure in accordance with the driver's brake operation is transferred to the wheel cylinders 23, thus causing generation of the braking force.

In any case, the brake control apparatus 20 begins the braking upon receiving a brake request. The brake request is generated when braking force needs to be applied to the vehicle. The brake request is generated, for example, in the case where a driver is operating the brake pedal 24, the case where while, during running of the vehicle, the distance to another vehicle is automatically controlled, the distance to the another vehicle becomes shorter than a predetermined distance, etc.

Figure 2:
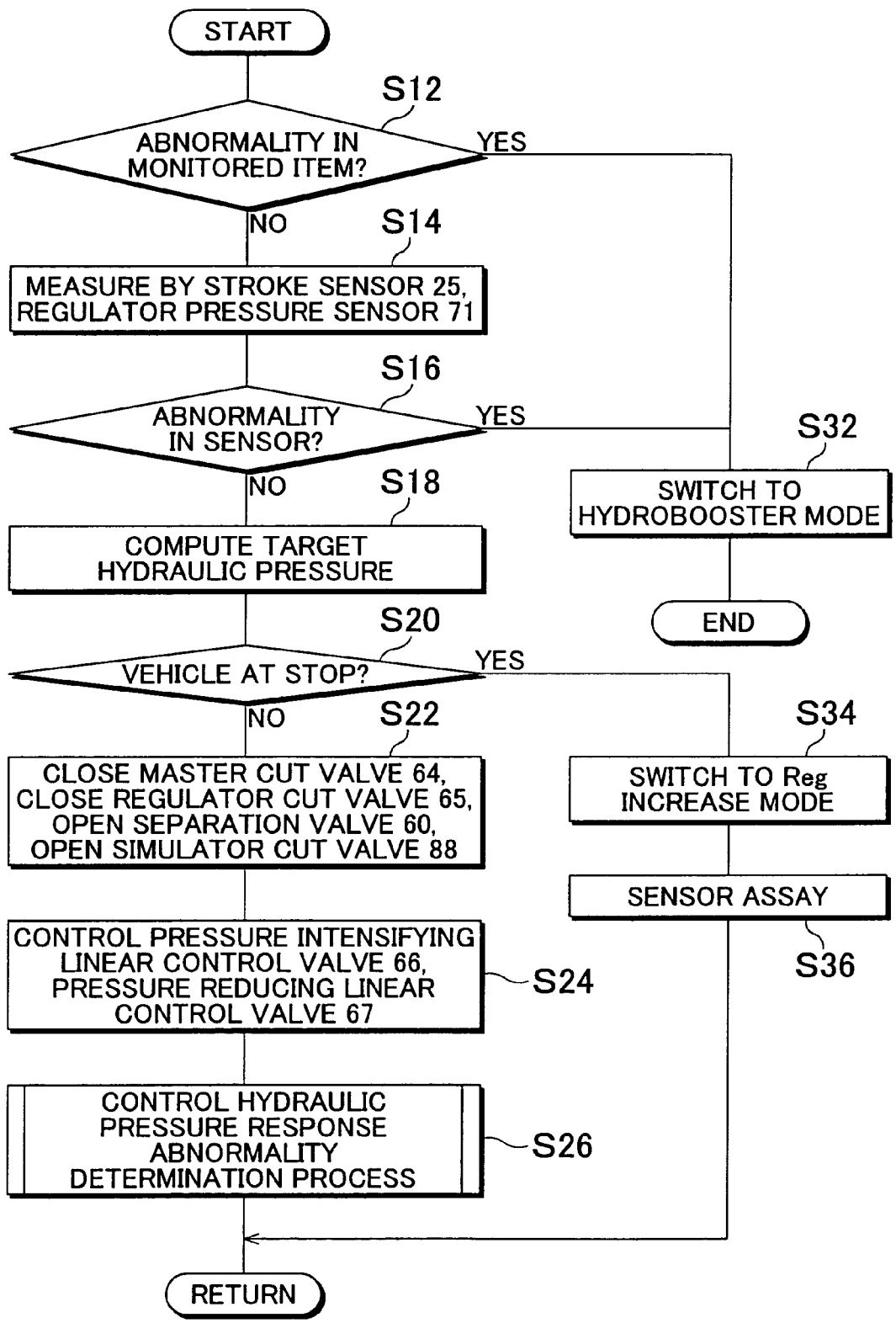
FIG. 2 is a flowchart for describing a control process performed during a regeneration cooperative control mode in accordance with the embodiment.

FIG. 2 is a flowchart for describing a control process performed during the regeneration cooperative control mode. During the regeneration cooperative control mode, the brake regeneration cooperative control is executed. The process shown in FIG. 2 is repeatedly executed on a predetermined cycle, for example, every several milliseconds or so, after a brake request is generated due to an operation of the brake pedal 24.

When the control process in the regeneration cooperative control mode begins, the brake ECU 70 first determines whether or not there is an abnormality corresponding to any one of monitored items (S12). Examples of the monitored items include the presence/absence of a short circuit or broken wiring inside the brake control apparatus 20, the presence/absence of an abnormality in the power hydraulic pressure source 30, based on a measured value provided by the accumulator pressure sensor 72, etc.

If it is determined that there is an abnormality corresponding to a monitored item (YES at S12), the brake ECU 70 switches the control mode from the regeneration cooperative control mode to the hydrobooster mode, thus stopping the brake regeneration cooperative control (S32). On the other hand, if it is determined that there is no abnormality in the monitored items (NO at S12), the brake ECU 70 acquires measured values provided by the stroke sensor 25 and the regulator pressure sensor 71 (S14). The amount of operation of the brake pedal 24 is detected by the stroke sensor 25, and the hydraulic pressure in the master cylinder unit 10 pressurized in association with the depression of the brake pedal 24 is measured by the regulator pressure sensor 71.

Subsequently, the brake ECU 70 determines whether or not the stroke sensor 25 and/or the regulator pressure sensor 71 has an abnormality, on the basis of measured values provided by the stroke sensor 25 and the regulator pressure sensor 71 (S16). In this embodiment, the stroke sensor 25 is provided in a parallel arrangement of two systems. The brake ECU 70 determines whether or not any of the sensors exhibits an abnormality, by comparing the measured values provided by the stroke sensors 25 and the measured value provided by the regulator pressure sensor 71. If there is a sensor that presents an abnormal measurement that is different from those of the other two sensors, the brake ECU 70 determines that the sensor presenting such an abnormal measured value has an abnormality. If it is determined that any one of the sensors has an abnormality (YES at S16), the brake ECU 70 switches the control mode from the regeneration cooperative control mode to the hydrobooster mode, thus stopping the brake regeneration cooperative control (S32).

If it is determined that neither the stroke sensor 25 nor the regulator pressure sensor 71 has an abnormality in (NO at S16), the brake ECU 70 computes the target hydraulic pressure of the wheel cylinders 23. At this time, the brake ECU 70 first calculates the requested hydraulic braking force that needs to be generated by the brake control apparatus 20, by subtracting the braking force provided by the regeneration from the total requested braking force. Here, the braking force provided by the regeneration is supplied from the hybrid ECU to the brake control apparatus 20. Then, the brake ECU 70 calculates the target hydraulic pressure of the wheel cylinders 23 on the basis of the calculated requested hydraulic braking force.

Next, the brake ECU 70 determines whether or not the vehicle is at a stop (S20). If the vehicle is already at a stop (YES at S20), the brake ECU 70 switches the control mode from the regeneration cooperative control mode to the Reg increase mode (S34), and then performs a sensor assay (S36). The sensor assay assays whether or not each of the control pressure sensor 73, the regulator pressure sensor 71, and the stroke sensor 25 is normal by comparing their respective measured values with one another.

Incidentally, it is not necessary to always switch to the Reg increase mode to perform the sensor assay process if the vehicle is at a stop. For example, the sensor assay process may be performed at an appropriate frequency, for example, once in several times of braking. After the sensor assay process ends, the process shown in FIG. 2 ends. When the next execution timing is reached, the process of FIG. 2 is executed again in the same manner.

If the vehicle is running (NO at S20), the brake ECU 70 causes the master cut valve 64 and the regulator cut valve 65 to close, and causes the separation valve 60 and the simulator cut valve 68 to open (S22). Due to this operation, the wheel cylinders 23 are shut off from the master cylinder unit 10, and receive the supply of brake fluid from the power hydraulic pressure source 30. Furthermore, the brake fluid delivered from the master cylinder 32 due to the driver's brake operation is supplied to the stroke simulator 69, and reaction force in accordance with the driver's depression force on the brake pedal 24 is created, so that good brake operation feel to the driver is maintained.

In this state, the brake ECU 70 controls the pressure intensifying linear control valve 66 and the pressure reducing linear control valve 67 in accordance with the target hydraulic pressure (S24). Concretely, the brake ECU 70 controls the electric current supplied to the two control valves 66, 67 to control the degree of opening for each of the two valves 66, 67. After that, the brake ECU 70 performs a control hydraulic pressure response abnormality determination process to determine whether or not the hydraulic pressure of the wheel cylinders 23 is being controlled normally (hereinafter, simply referred to as "process of step 26") (S26). Details of the process of step 26 will be described with reference to FIGS. 3 and 4. Briefly, in this process, it is determined whether or not the wheel cylinder pressure is being controlled normally on the basis of the measured value of the control pressure sensor 73. As the process of step 26 ends, the process shown in FIG. 2 ends. When the next execution timing is reached, the process of FIG. 2 is executed again in the same manner.

Figure 3:
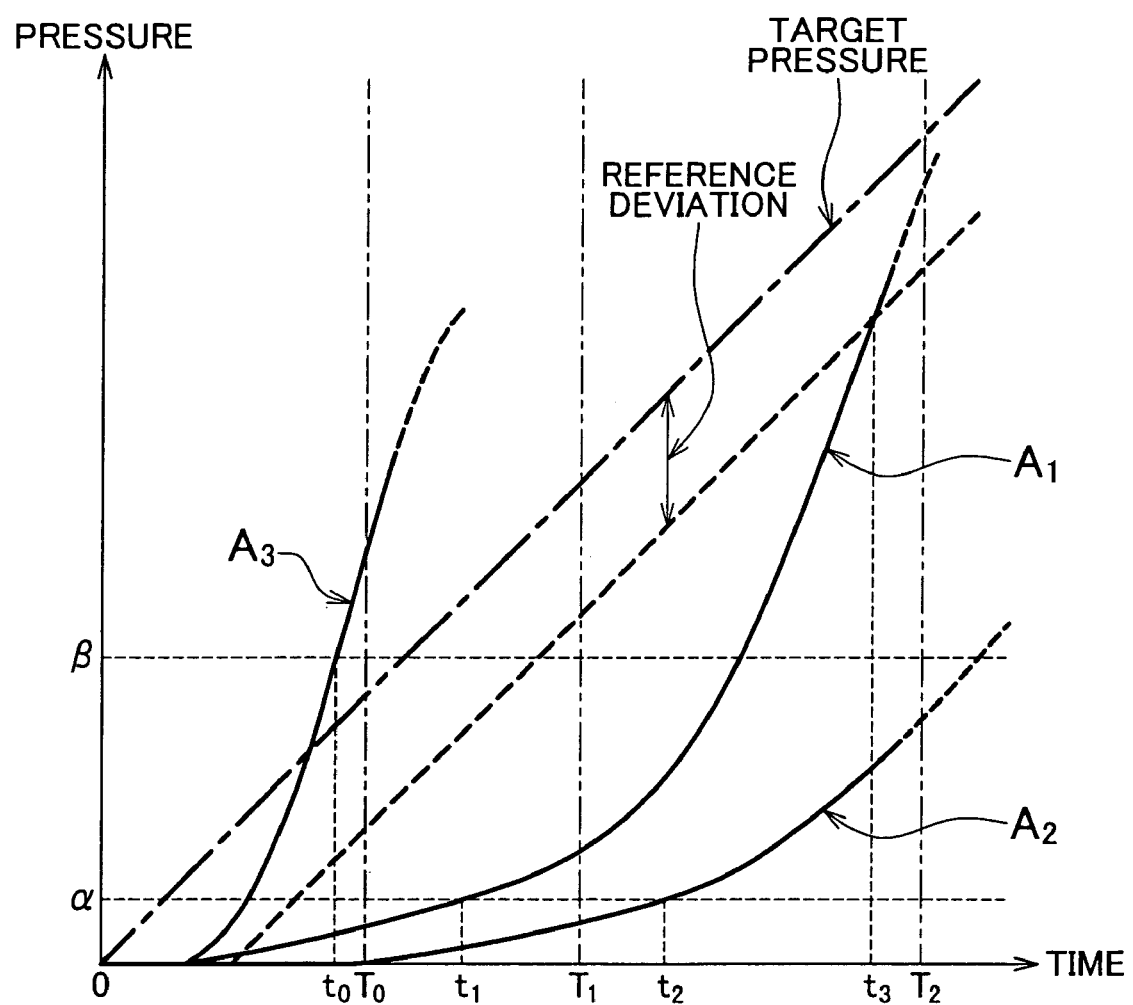
FIG. 3 is a diagram showing the control hydraulic pressure that acts on wheel cylinders after a brake request.
Figure 4:
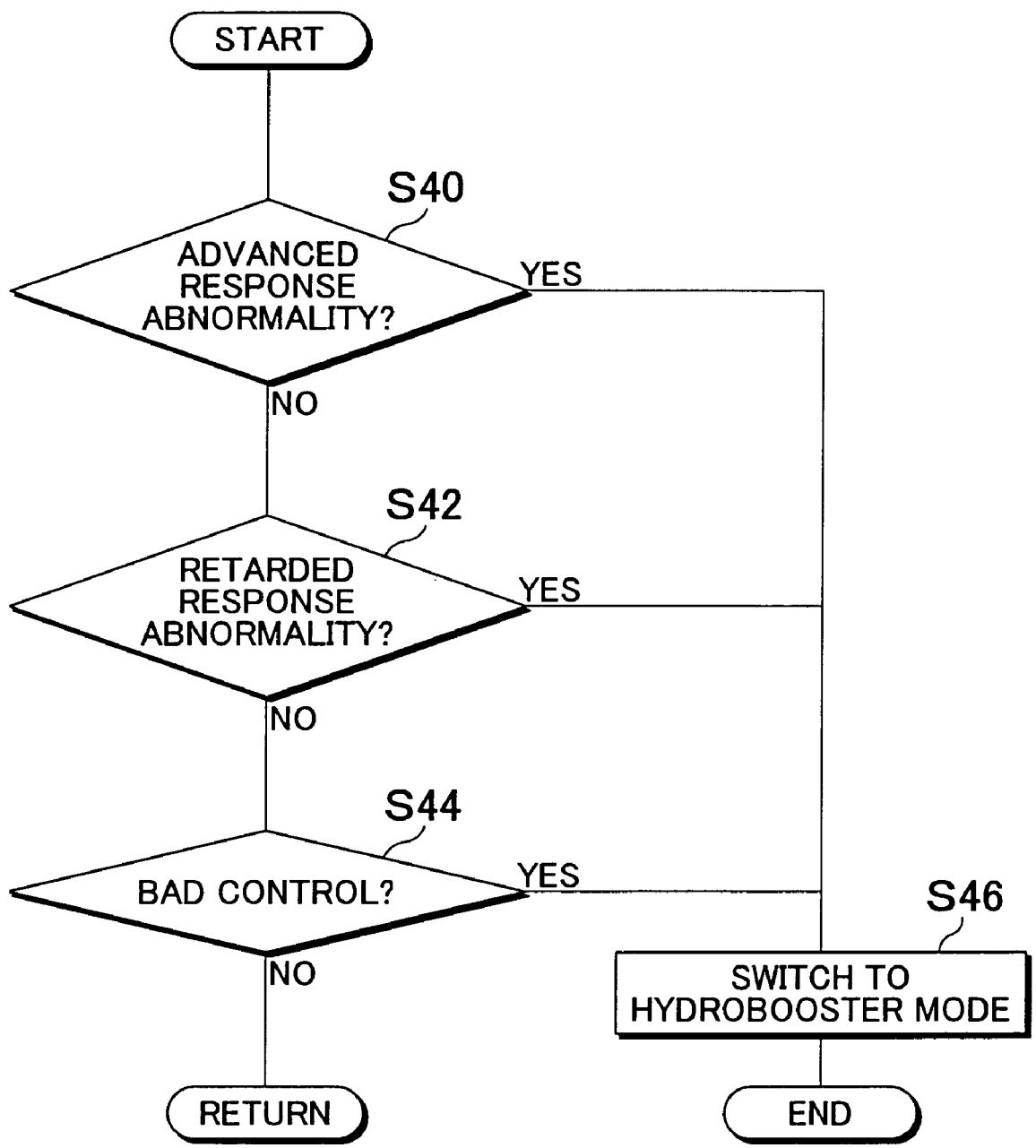
FIG. 4 is a flowchart for describing a control hydraulic pressure response abnormality determination process in accordance with the embodiment.

With reference to FIGS. 3 and 4, the process of step 26 will be described. The process of step 26 is a process for determining whether or not the response of the wheel cylinder pressure after the brake request is normal. If the response of the wheel cylinder pressure is not normal, there is a possibility that the brake regeneration cooperative control cannot normally apply the requested braking force to each wheel; therefore, the brake ECU 70 switches the control mode to the hydrobooster mode.

In the process of step 26, determination is made regarding the presence/absence of three abnormalities: an advanced response abnormality, a retarded response abnormality, and a bad control. Here, the advanced response abnormality refers to a state where the control hydraulic pressure sharply increases beyond the target hydraulic pressure because of an open failure or a leakage abnormality of the pressure intensifying linear control valve 66, or impossibility of linear control of the degree of opening of the control valve. The retarded response abnormality refers to a state where the increase in the control hydraulic pressure is excessively retarded because of a closed failure or a flow shortage of the pressure intensifying linear control valve 66, or the like. The bad control refers to a state where the control hydraulic pressure is not following the target hydraulic pressure, and, for example, refers to an event where a state of the deviation between the target hydraulic pressure and the control hydraulic pressure exceeding a reference deviation continues beyond a predetermined criterion time. Incidentally, the open failure refers to an abnormal state where the valve cannot be closed and remains open even when it needs to be closed. The closed failure refers to an abnormal state where the valve cannot be opened and remains closed even when it needs to be open.

FIG. 3 is a diagram showing the control hydraulic pressure that acts on the wheel cylinders after a brake request. The vertical axis indicates the differential pressure from the atmospheric pressure, and the horizontal axis indicates the time that elapses from the occurrence of the brake request. FIG. 3 shows control hydraulic pressure responses during an initial period immediately following a brake request, and exemplifies an initial response $A_1$ in the case of normality, an initial response $A_2$ in the case of the retarded response abnormality, and an initial response $A_3$ in the case of the advanced response abnormality. The target hydraulic pressure, shown by a one-dot chain line in FIG. 3, increases with time, after the brake request is made. Incidentally, although in FIG. 3 the target hydraulic pressure linearly increases, this is a mere example. Furthermore, a retarded response criterion pressure $\alpha$ and an advanced response criterion pressure $\beta$ are shown by dotted lines, and an advanced response criterion time $T_0$, a retarded response criterion time $T_1$, and a bad control criterion time $T_2$ are shown by two-dot lines.

The normal initial response $A_1$ reaches the retarded response criterion pressure $\alpha$ before the retarded response criterion time $T_1$ elapses, more concretely, when a time $t_1$ elapses following the brake request. The normal initial response $A_1$ continues increasing after the time $t_1$ as well, and is well above the retarded response criterion pressure $\alpha$ at the retarded response criterion time $T_1$. Thus, if the control hydraulic pressure reaches the retarded response criterion pressure $\alpha$ before the retarded response criterion time $T_1$ elapses, it is not determined that there is a retarded response abnormality.

Here, the control hydraulic pressure is measured by the control pressure sensor 73. The retarded response criterion pressure $\alpha$ is pre-set as a threshold value for determining the rise of the control hydraulic pressure, and is pre-stored in the brake ECU 70. In this embodiment, the retarded response criterion pressure $\alpha$ is set at, for example, about 0.5 to 1.0 MPa. The retarded response criterion time $T_1$ is pre-set as a threshold value for determining the retarded response abnormality of the control hydraulic pressure, and is pre-stored in the brake ECU 70. The retarded response criterion time $T_1$ starts to be counted at the time point of occurrence of the brake request, and is pre-set so as to expire prior to the expiration of the below-described bad control criterion time $T_2$. The retarded response criterion time $T_1$ and the retarded response criterion pressure $\alpha$ may be empirically determined.

Furthermore, as for the initial response $A_1$, its deviation from the target hydraulic pressure is less than the reference deviation when a time $t_3$ elapses, and after that, the hydraulic pressure follows the target hydraulic pressure. That is, the deviation of the initial response $A_1$ from the target value at the elapse of the bad control criterion time $T_2$ is smaller than the reference deviation. Thus, if the deviation from the target hydraulic pressure becomes less than the reference deviation before the bad control criterion time $T_2$ elapses, it is not determined that the bad control is present.

Here, the reference deviation may be set at a constant value, or may also be set at a predetermined proportion to the target hydraulic pressure. In this embodiment, the reference deviation is set at, for example, a constant value of 1 MPa. The bad control criterion time $T_2$ is pre-set as a threshold value for determining the bad control of the control hydraulic pressure, and is pre-stored in the brake ECU 70.

Furthermore, the initial response $A_2$ in the case of the retarded response abnormality reaches the retarded response criterion pressure $\alpha$ when a time $t_2$ elapses following the brake request. The time $t_2$ comes after the elapse of the retarded response criterion time $T_1$. The initial response $A_2$ has not reached the retarded response criterion pressure $\alpha$ at the retarded response criterion time $T_1$. In such a case, it is determined that the retarded response abnormality is present.

The initial response $A_3$ in the case of the advanced response abnormality has already exceeded the target hydraulic pressure when a time $t_0$ elapses following the brake request. Then, the control hydraulic pressure continues increasing, and is above the advanced response criterion pressure $\beta$ at the advanced response criterion time $T_0$. Thus, if the control hydraulic pressure suddenly increases, and is already higher than the advanced response criterion pressure $\beta$ at the advanced response criterion time $T_0$, it is determined that the advanced response abnormality is present.

Here, it is preferable that the advanced response criterion pressure $\beta$ be set at a value that is greater than the target hydraulic pressure at the advanced response criterion time $T_0$. For example, the advanced response criterion pressure $\beta$ is set at about 3 to 4 MPa. This may be explained as follows. Since the control hydraulic pressure rarely exceeds the target hydraulic pressure immediately after the control request, it is considered that it may be determined that the advanced response abnormality is present, if the control hydraulic pressure is higher than the target hydraulic pressure at the advanced response criterion time $T_0$ immediately after the control request. The advanced response criterion time $T_0$ is set so as to precede the retarded response criterion time $T_1$. Then, the advanced response abnormality of the control hydraulic pressure is detected earlier than the retarded response abnormality thereof. Therefore, it is possible to quickly restrain generation of excessive braking force that is beyond the request braking force.

FIG. 4 is a flowchart for describing the process of step 26. When the process of step 26 begins, the brake ECU 70 first determines whether or not the advanced response abnormality is present (S40). That is, the brake ECU 70 determines whether or not the control hydraulic pressure has exceeded the advanced response criterion pressure $\beta$ by the elapse of the advanced response criterion time $T_0$ following the generation of the brake request. If it is determined that the control hydraulic pressure has not reached the advanced response criterion pressure $\beta$, the brake ECU 70 determines that the advanced response abnormality is not present (NO at S40), and proceeds to the determination regarding the retarded response abnormality (S42). If it is determined that the control hydraulic pressure has exceeded the advanced response criterion pressure $\beta$, the brake ECU 70 determines that the advanced response abnormality is present (YES at S40). If the advanced response abnormality is present, the brake ECU 70 stops the brake regeneration cooperative control, and switches to the hydrobooster mode (S46), thus ending the process of step 26.

The brake ECU 70 determines whether or not the retarded response abnormality is present (S42). That is, the brake ECU 70 determines whether or not the control hydraulic pressure has reached the retarded response criterion pressure $\alpha$ by the elapse of the retarded response criterion time $T_1$ following the generation of the brake request. If it is determined that the control hydraulic pressure has reached the retarded response criterion pressure $\alpha$ by the elapse of the retarded response criterion time $T_1$, the brake ECU 70 determines that the retarded response abnormality is not present (NO at S42), and then proceeds to the determination regarding the bad control (S44). If it is determined that the control hydraulic pressure has not reached the retarded response criterion pressure $\alpha$ at the elapse of the retarded response criterion time $T_1$, the brake ECU 70 determines that the retarded response abnormality is present (YES at S42). If the retarded response abnormality is present, the brake ECU 70 stops the brake regeneration cooperative control and switches to the hydrobooster mode (S46), thus ending the process of step 26.

Furthermore, the brake ECU 70 determines whether or not the bad control is present (S44). That is, the brake ECU 70 determines whether or not the deviation calculated from the target hydraulic pressure and the control hydraulic pressure has become less than the reference deviation before the bad control criterion time $T_2$ elapses. If it is determined that the deviation of the control hydraulic pressure has become less than the reference deviation by the elapse of the bad control criterion time $T_2$, the brake ECU 70 determines that the bad control is not present (NO at S44), and ends the process shown in FIG. 2. If it is determined that the deviation of the control hydraulic pressure is still greater than the reference deviation at the elapse of the bad control criterion time $T_2$, the brake ECU 70 determines that the bad control is present (YES at S44). If the bad control is present, the brake ECU 70 stops the brake regeneration cooperative control, and switches to the hydrobooster mode (S46), and then ends the process of step 26.

In this embodiment, using the pair of the pressure intensifying linear control valve 66 and the pressure reducing linear control valve 67, the apparatus controls the supply and discharge of brake fluid with respect to the wheel cylinders 23 of the wheels. Thus, the pressure intensifying linear control valve 66 and the pressure reducing linear control valve 67 are provided for shared use for the wheel cylinders 23. Therefore, the cost can be reduced in comparison with a construction in which control valves are provided individually for each wheel cylinder 23. However, the provision of the pressure intensifying linear control valve 66 and the like for shared use involves capacity increases of the supply object relative to the supplied amount of flow, and results in an elongated delay time of the rise of the control hydraulic pressure. Therefore, this embodiment adopts two stages of determination regarding the response delay, that is, determination regarding the retarded response abnormality and the bad control as described above. This makes it possible to quickly detect an excessive response delay caused by an abnormality such as the closed failure of the pressure intensifying linear control valve 66, or the like. Hence, it becomes possible to promptly switch to the hydrobooster if an abnormality occurs, and to quickly eliminate the state where the braking force is insufficient.

As described above, during the regeneration cooperative control mode, the brake fluid delivered from the power hydraulic pressure source 30 is supplied to the wheel cylinders 23 via the pressure intensifying linear control valve 66, so that braking force is applied to the wheels. Furthermore, the brake fluid is discharged from the wheel cylinders 23 via the pressure reducing linear control valve 67 in accordance with need. In this manner, the braking force applied to the wheels is controlled.

On the other hand, during the Reg increase mode and the hydrobooster mode, the hydraulic pressure of the master cylinder unit 10 pressurized in accordance with the amount of brake operation performed by a driver is transferred to the wheel cylinders 23. During the Reg increase mode, the brake ECU 70 causes the regulator cut valve 65, the separation valve 60, and the simulator cut valve 68 to be in the open state, and causes the master cut valve 64 to be in the closed state. As a result, the regulator pressure is transferred to the wheel cylinders 23, so that braking force is applied to the wheels. At this time, the brake fluid delivered from the master cylinder 32 is supplied to the stroke simulator 69.

Therefore, during the Reg increase mode, the variations in the hydraulic pressure in the wheel cylinders 23 are not transferred directly to the master cylinder 32, which is favorable in that good brake feel is attained. Furthermore, the common control hydraulic pressure acts on the control pressure sensor 73 and the regulator pressure sensor 71, so that the assay of sensors can be performed with further improved precision.

During the hydrobooster mode, on the other hand, the brake ECU 70 opens the master cut valve 64 and the regulator cut valve 65, and closes the separation valve 60 and the simulator cut valve 68. As a result, the master cylinder pressure is transferred to the front wheel-side wheel cylinders 23FR, 23FL via the first system, and the regulator pressure is transferred to the rear wheel-side wheel cylinders 23RR, 23RL, so that braking force is applied to each wheel.

In this embodiment, the hydrobooster mode is used as a provisional control mode when the brake regeneration cooperative control is not performed, because of occurrence of an abnormality or the like, as stated above. During the hydrobooster mode, the first system and the second system are separated by closing the separation valve 60. This operation is performed in order to make it possible to apply braking force through a normal system even if another abnormality, such as liquid leakage from piping or the like, should occur in either one of the systems. The provision of the separation valve 60 in this manner further promotes safety.

In order to further improve the fuel economy of the vehicle, it is desirable to begin the regeneration cooperative control promptly after the running drive source of the vehicle is started up. However, in the light of fail-safe design, it is desirable to verify that the elements of the brake control apparatus 20, including the separation valve 60 and the like, do not have any abnormality. Therefore, in this embodiment, in order to ensure that the regeneration cooperative control will be promptly executed from the time of the first braking operation performed after the startup of the running drive source, the brake ECU 70 performs a first abnormality determination process during the stop of the running drive source.

Figure 5:
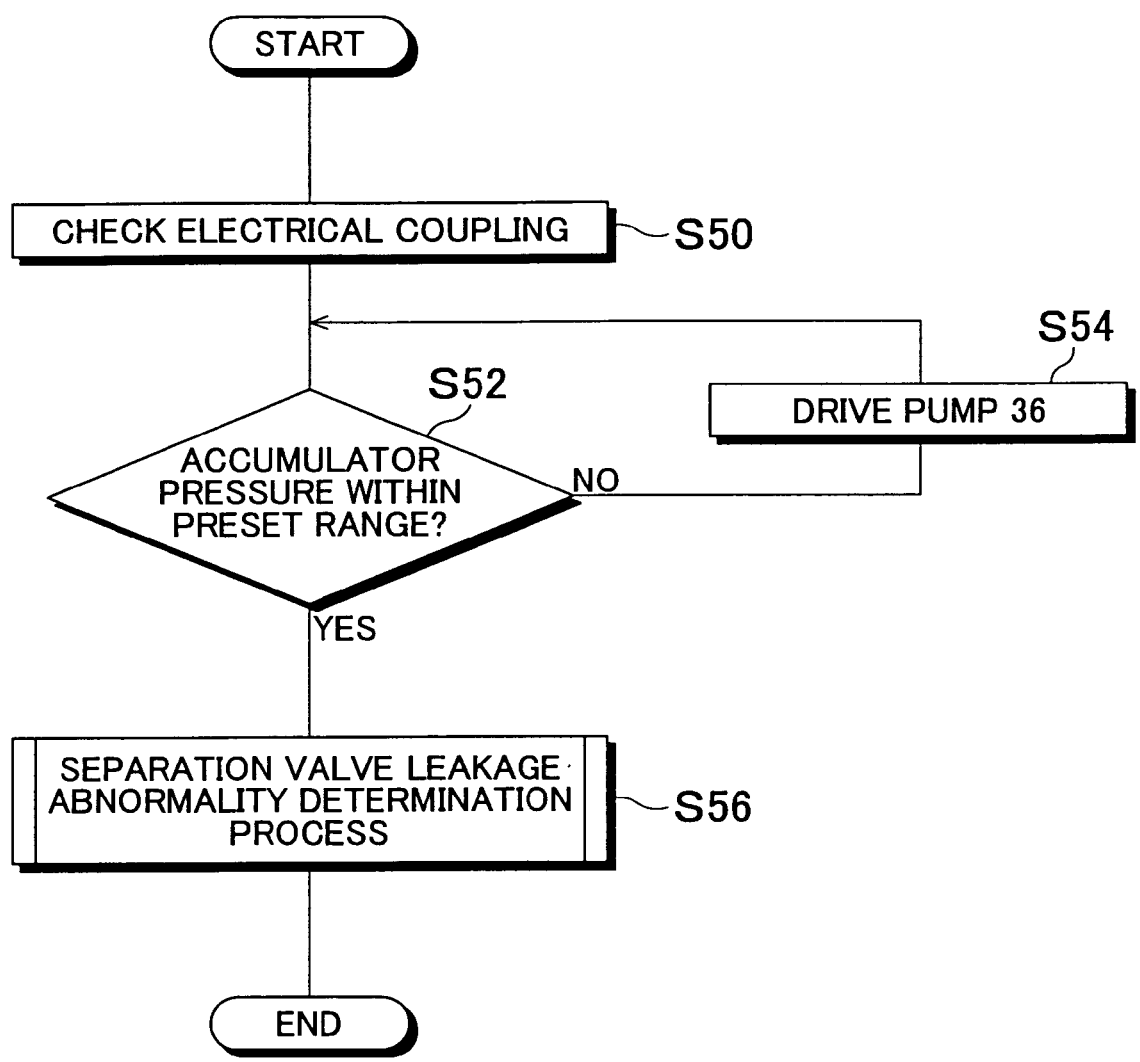
FIG. 5 is a flowchart for describing a first abnormality determination process in accordance with the embodiment.

FIG. 5 is a flowchart for describing the first abnormality determination process in accordance with the embodiment. The process shown in FIG. 5 begins when a signal related to the entry of an occupant into the vehicle (hereinafter, referred to as "entry related signal" when appropriate) is input to the brake ECU 70. Here, the occupant may be any person that enters the vehicle, and is not limited to the driver. In this embodiment, the entry related signal is output from the courtesy switch 80 that detects the opening/closure of the doors of the vehicle, in association with the opening/closure of a door performed by an occupant.

Incidentally, it is appropriate that the entry related signal be a signal that is output due to a predetermined operation performed by an occupant during a period from the approach of the occupant to the vehicle to the startup of the running drive source after the occupant enters. Examples of the predetermined operation include the unlocking of a door lock, the insertion of an ignition key, an operation of a seat belt, etc. Furthermore, it is also permissible to provide a weight sensor for the seats of the vehicle so that the weight sensor outputs a entry related signal, or to receive electromagnetic waves from a portable communication device carried by an occupant and accordingly output a entry related signal.

When the first abnormality determination process shown in FIG. 5 begins, the brake ECU 70 first checks the electrical couplings within the brake control apparatus 20 (S50). Concretely, for example, the presence/absence of a break or a shortcircuit of wiring within the brake control apparatus 20, or the like is checked. Then, the brake ECU 70 determines whether or not the accumulator pressure is within a predetermined pressure range needed in order to execute the abnormality determination process, on the basis of the measured value of an accumulator sensor 72 (S52). It is appropriate that the accumulator pressure herein be a degree of pressure that allows execution of the abnormality determination process. This accumulator pressure may be smaller than the accumulator pressure that is considered to needed during ordinary running of the vehicle.

If the accumulator pressure is outside the predetermined pressure range (NO at S52), the pump 36 is driven to raise the accumulator pressure (S54). If the accumulator pressure is within the predetermined pressure range (YES at S52), a separation valve leakage abnormality determination process (hereinafter, referred to simply as "process of step 56") is performed (S56). As the process of step 56 ends, the first abnormality determination process ends.

Figure 6:
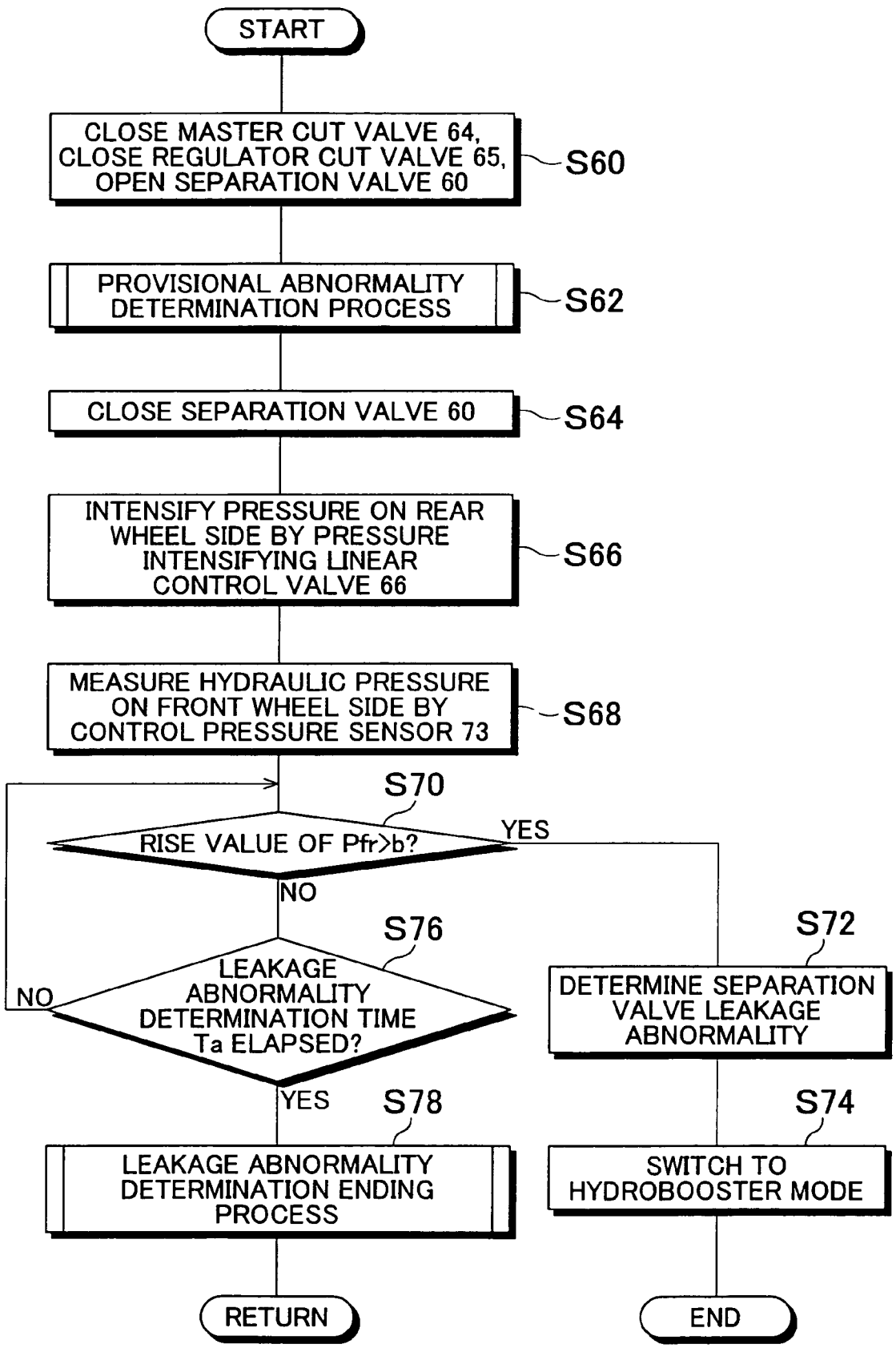
FIG. 6 is a flowchart for describing a separation valve leakage abnormality determination process in accordance with the embodiment.

Subsequently, the process of step 56 will be described in detail with reference to FIG. 6. FIG. 6 is a flowchart for describing the process of step 56. Whether or not the separation valve 60 has a leakage abnormality and is in a state of open failure is determined on the basis of the change in the differential pressure generated when the separation valve 60 is closed.

As shown in FIG. 6, when the process of step 56 begins, the brake ECU 70 first supplies a control electric current to each of the master cut valve 64, the regulator cut valve 65, and the separation valve 60, to close the master cut valve 64 and the regulator cut valve 65, and open the separation valve 60 (S60). Subsequently, the brake ECU 70 performs a provisional abnormality determination process (hereinafter, referred to simply as "process of step 62") (S62). In the process of step 62, prior to the determination as to the presence/absence of a leakage abnormality of the separation valve 60, it is determined whether or not the differential pressure for detecting the leakage abnormality can be normally generated. The process of step 62 will be described with reference to FIG. 7.

If no abnormality is detected in the process of step 62, the brake ECU 70 stops the supply of the control electric current to the separation valve 60 to close the separation valve 60 (S64). Then, the brake ECU 70 controls the pressure intensifying linear control valve 66 so as to intensify the pressure of the wheel cylinders 23RR, 23RL on the rear wheel side (S66). Thus, the hydraulic pressure in the second channel 45b of the main channel 45 becomes higher than the hydraulic pressure in the first channel 45a, generating a differential pressure across the separation valve 60. Here, whether or not the pressure intensifying linear control valve 66 is operating can be judged from, for example, variation of the measured value of the accumulator pressure sensor 72.

Incidentally, for more reliable detection of increase in the hydraulic pressure in the second channel 45b of the main channel 45, it is permissible to further provide a pressure sensor that measures the hydraulic pressure in the second channel 45b of the main channel 45. However, in the light of curbing the number of sensors disposed and reducing the cost, it is permissible to use the measured value of the accumulator pressure sensor 72 as in this embodiment.

Then, the brake ECU 70 measures the hydraulic pressure in the first channel 45a of the main channel 45, that is, the hydraulic pressure in the front wheel-side wheel cylinders 23FR, 23FL, via the control pressure sensor 73 (S68). The hydraulic pressure Pfr measured by the control pressure sensor 73 is input to the brake ECU 70.

The brake ECU 70 determines whether or not the measured value Pfr of the control pressure sensor 73 rises beyond a predetermined leakage abnormality determination threshold value b before a predetermined leakage abnormality determination time Ta elapses. More specifically, the brake ECU 70 first determines whether or not a rise value of the measured value Pfr is above the leakage abnormality determination threshold value b (S70). If the increase of the measured value Pfr is within the leakage abnormality determination threshold value b (NO at S70), the brake ECU 70 then determines whether or not the leakage abnormality determination time Ta has elapsed (S76). If the leakage abnormality determination time Ta has not elapsed (NO at S76), the brake ECU 70 then determines again whether or not the increase of the measured value Pfr is above the leakage abnormality determination threshold value b (S70).

If the rise value of the measured value Pfr exceeds the leakage abnormality determination threshold value b before the elapse of the leakage abnormality determination time Ta (YES at S70), the brake ECU 70 determines that the separation valve 60 has a leakage abnormality (S72). If the separation valve 60 has a leakage abnormality, the brake ECU 70 switches the control mode to the hydrobooster mode (S74) without performing the regeneration cooperative control, and ends the process. Incidentally, the leakage abnormality determination threshold value b may be empirically determined in accordance with the capacity of the wheel cylinders 23, or the like, where appropriate.

On the other hand, if the leakage abnormality determination time Ta elapses without the rise value of the measured value Pfr exceeding the leakage abnormality determination threshold value b (YES at S76), the brake ECU 70 performs a leakage abnormality determination ending process (S78). The leakage abnormality determination ending process S78 will be described later with reference to FIG. 10. After the leakage abnormality determination ending process S78 ends, the brake ECU 70 ends the process of step 56.

Incidentally, in this embodiment, the pressure intensifying linear control valve 66 is operated to cause a differential pressure across the separation valve 60 with the pressure being higher on the rear wheel side than on the front wheel side. This may be changed. For example, the pressure may be made lower on the rear wheel side than on the front wheel side by operating the pressure reducing linear control valve 67.

Furthermore, when a variation in the differential pressure across the separation valve 60 is to be detected, the detection may be performed with the ABS retention valves 51 to 54 closed. This shuts off the separation valve 60 from the wheel cylinders 23, so that the capacities on the two sides of the separation valve 60 are formed only by channels of the main channel 45, and the like, and thus become small. Hence, the sensitivity for differential pressure variation at the time of occurrence of leakage through the separation valve 60 can be improved.

Figure 7:
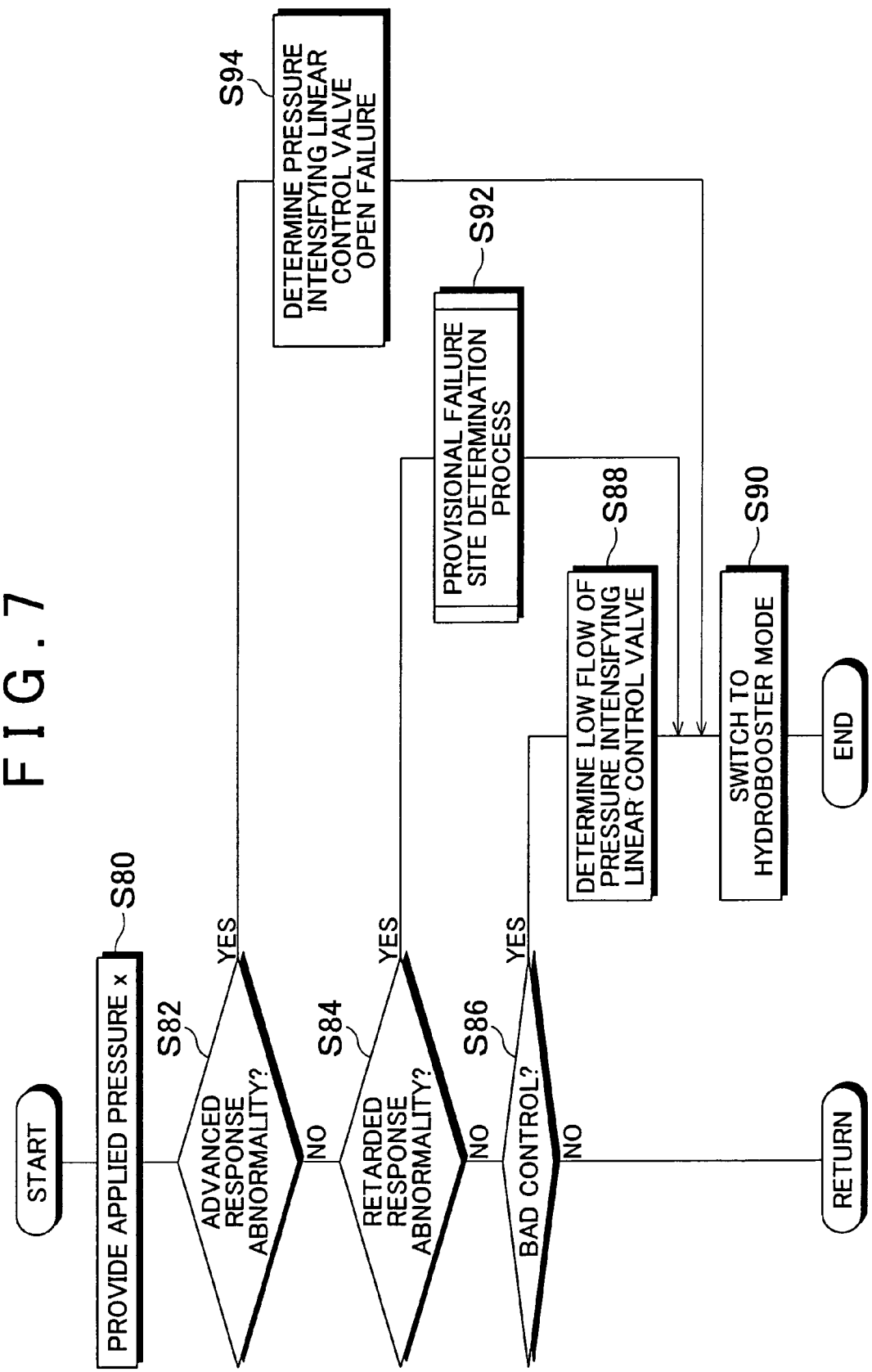
FIG. 7 is a flowchart for describing a provisional abnormality determination process in accordance with the embodiment.

Next, the process of step 62 shown in FIG. 6 will be described in detail with reference to FIG. 7. FIG. 7 is a flowchart for describing the process of step 62. According to the process of step 62, whether or not the differential pressure for detecting a leakage abnormality is normally generated is determined prior to the determination as to the presence/absence of the leakage abnormality of the separation valve 60. This reduces the possibility of confusing the variation in the differential pressure across the separation valve 60 resulting from a cause that is different from the leakage abnormality of the separation valve 60, and the variation in the differential pressure caused by the leakage abnormality of the separation valve 60. Therefore, it becomes possible to more reliably determine the presence/absence of the leakage abnormality of the separation valve 60.

When the process of step 62 begins, the brake ECU 70 controls the pressure intensifying linear control valve 66 to apply a pressurization x to the main channel 45 (S80). At this time, since the separation valve 60 is open (see S60 in FIG. 6), the applied pressure x acts equally on the two sides of the separation valve 60. When the applied pressure x is to be provided, the brake ECU 70 performs a feedback control on the basis of the measured value of the control pressure sensor 73. On the basis of the response of the control hydraulic pressure when providing the applied pressure x to the main channel 45, the brake ECU 70 performs an advanced response abnormality determination (S82), a retarded response abnormality determination (S84), and a bad control abnormality determination (S86) in substantially the same manner as the control hydraulic pressure response abnormality determination process S26 shown in FIG. 4. Incidentally, in the case where the applied pressure x is applied stepwise, the advanced response abnormality determination may be omitted.

If it is determined that the advanced response abnormality is present (YES at S82), the brake ECU 70 determines that the pressure intensifying linear control valve 66 has the open failure (S94), and switches to the hydrobooster mode (S90). If the advanced response abnormality is not present (NO at S82), the brake ECU 70 determines whether or not the retarded response abnormality is present (S84). If it is determined that the retarded response abnormality is present (YES at S84), the brake ECU 70 performs a provisional failure site determination process (hereinafter, simply referred to as "process of step 92") (S92). By the process of step 92, it is possible to determine which one of the elements of the brake control apparatus 20 has an abnormality that has caused the retarded response abnormality. The process of step 92 will be described later with reference to FIGS. 8 and 9. After the failure site is distinguished and the process of step 92 ends, the brake ECU 70 switches the control mode to the hydrobooster mode (S90).

If it is determined that the retarded response abnormality is not present (NO at S84), the brake ECU 70 determines whether or not the bad control is present (S86). If the bad control is present and therefore the deviation of the control hydraulic pressure from the target hydraulic pressure does not become smaller than the reference deviation (YES at S86), the brake ECU 70 determines that the amount of flow of brake fluid supplied from the pressure intensifying linear control valve 66 is low (S88). In this case, too, the brake ECU 70 switches the control mode to the hydrobooster mode (S90). If it is determined that the bad control is not present (NO at S86), the process of step 62 ends, and the brake ECU 70 ends the process shown in FIG. 6.

Figure 8:
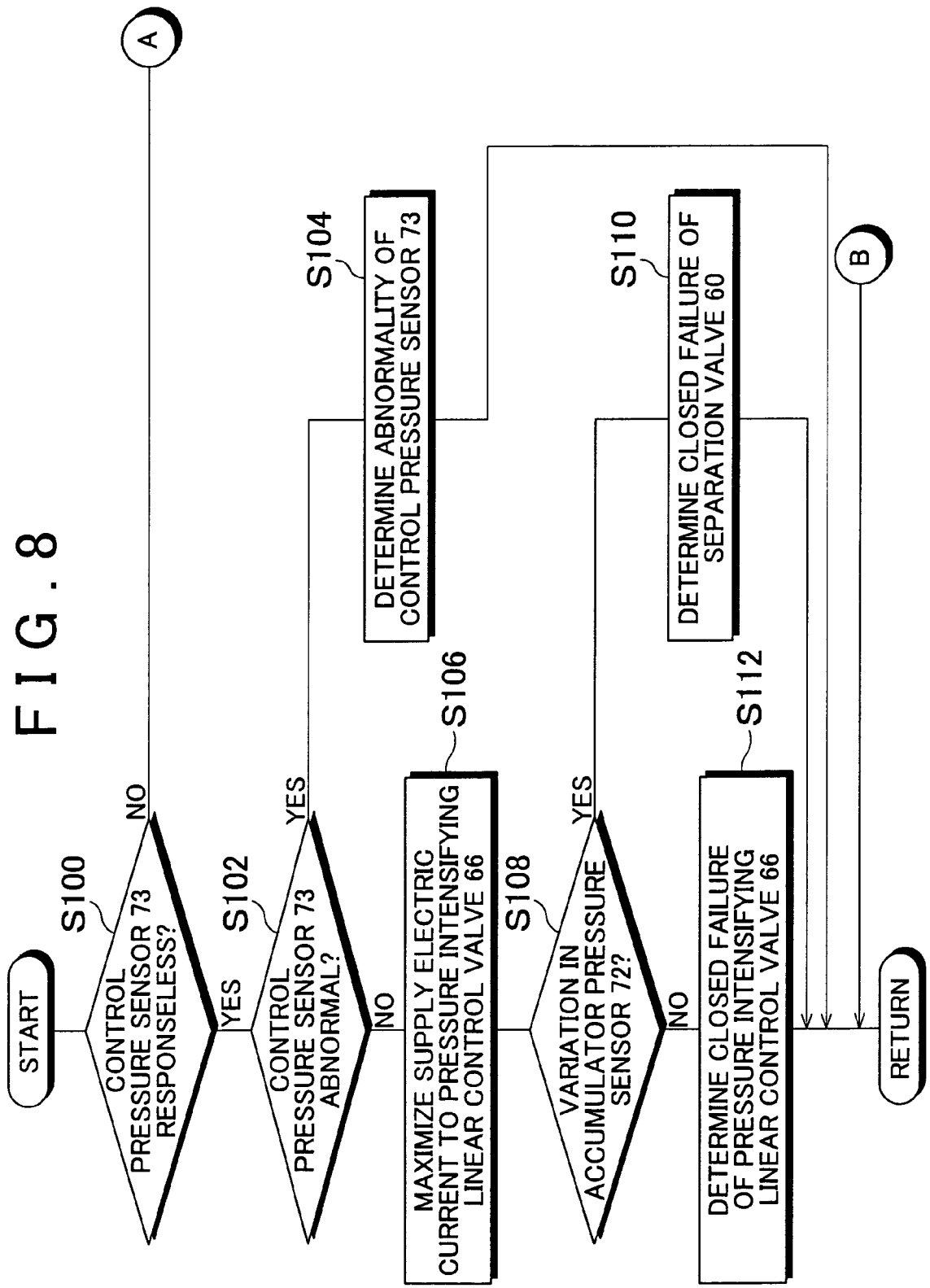
FIG. 8 is a flowchart for describing a provisional failure site determination process in accordance with the embodiment.
Figure 9:
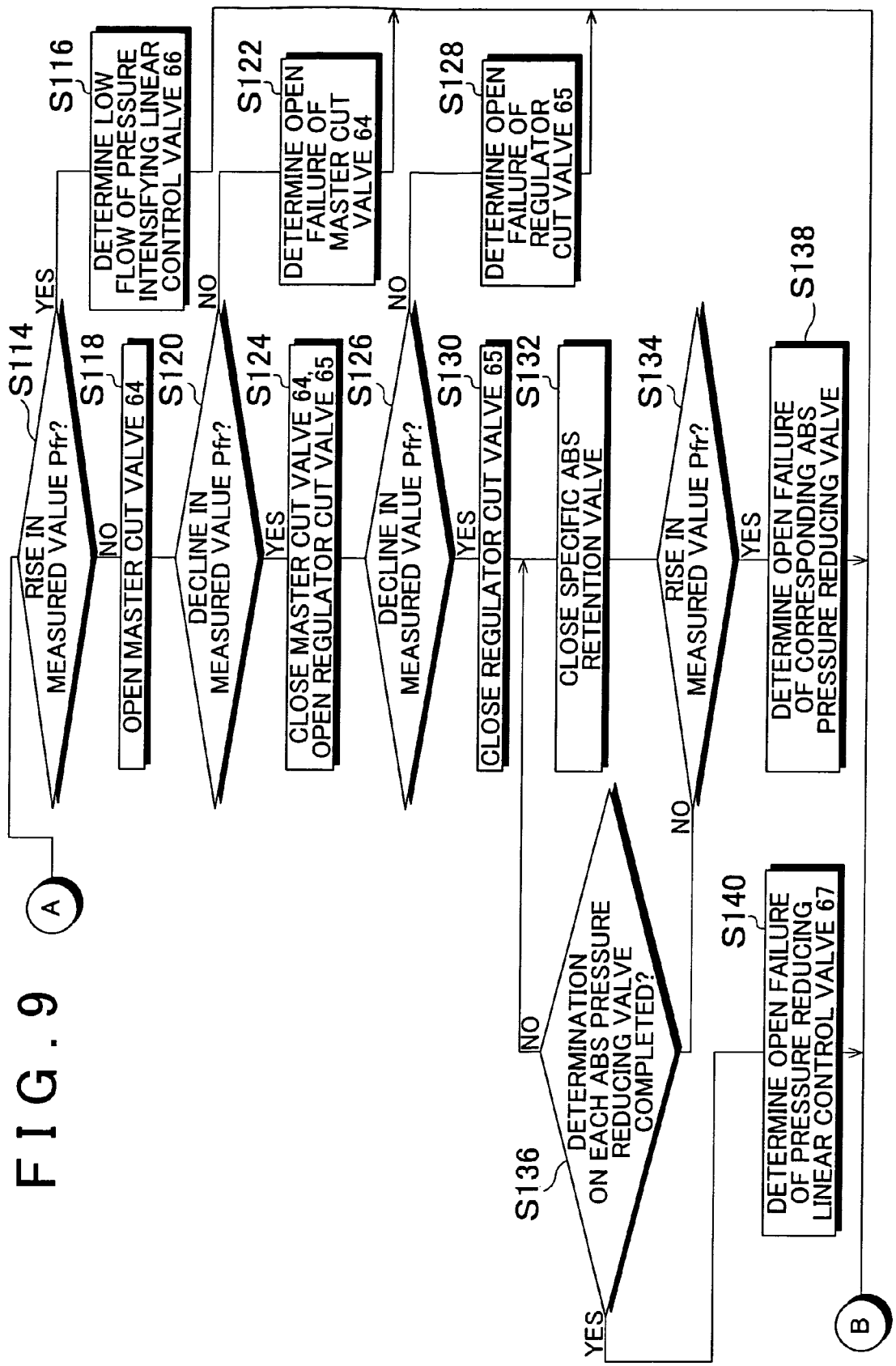
FIG. 9 is a flowchart for describing the provisional failure site determination process in accordance with the embodiment.

FIGS. 8 and 9 are a flowchart for describing the process of step 92 shown in FIG. 7. When the process of step 92 begins, the brake ECU 70 determines whether or not the control pressure sensor 73 is responsive, that is, whether or not there is any variation in the measured value of the control pressure sensor 73 (S100). If the control pressure sensor 73 is not responsive (YES at S100), the brake ECU 70 causes the control pressure sensor 73 to perform self-diagnosis, and determines whether or not the control pressure sensor 73 has an abnormality (S102). This makes it possible to discriminate between the control pressure sensor 73 being non-responsive, due to the presence of an abnormality in the control pressure sensor 73, and the control hydraulic pressure actually remaining unchanged due to a different abnormality, such as an abnormality of a control valve, or the like.

If a result of the self-diagnosis of the control pressure sensor 73 indicates occurrence of an abnormality (YES at S102), the brake ECU 70 determines that the control pressure sensor 73 has an abnormality (S104), and ends the process shown in FIG. 7. That is, the brake ECU 70 switches to the hydrobooster mode (S90 in FIG. 7). If the result of the self-diagnosis of the control pressure sensor 73 does not indicate occurrence of an abnormality (NO at S102), the brake ECU 70 sets the control electric current supplied to the pressure intensifying linear control valve 66, to a maximum value (S106). If the supply electric current to the pressure intensifying linear control valve 66 is maximized, the degree of opening of the pressure intensifying linear control valve 66 becomes maximum provided that the pressure intensifying linear control valve 66 normally functions; therefore, the measured value of the accumulator pressure sensor 72 provided upstream of the pressure intensifying linear control valve 66 decreases.

After the supply electric current to the pressure intensifying linear control valve 66 is maximized, the brake ECU 70 determines whether or not there is a variation in the measured value of the accumulator pressure sensor 72 (S108). If there is no variation in the measured value of the accumulator pressure sensor 72 (NO at step 108), the brake ECU 70 determines that the pressure intensifying linear control valve 66 has the closed failure (S112). This is because the fact that no variation is observed in the measured value of the accumulator pressure sensor 72 despite the maximization of the supply electric current to the pressure intensifying linear control valve 66 suggests that the pressure intensifying linear control valve 66 is closed. After that, the brake ECU 70 ends the process shown in FIG. 7, and switches to the hydrobooster mode (S90 in FIG. 7). Incidentally, if there is no variation in the measured value of the accumulator pressure sensor 72, it is also permissible to determine whether or not the accumulator pressure sensor 72 has an abnormality, through the use of the self-diagnostic function of the accumulator pressure sensor 72.

If it is determined that there is a variation in the measured value of the accumulator pressure sensor 72 (YES at S108), the brake ECU 70 determines that the separation valve 60 has the closed failure (S110). This is the case where the supply of brake fluid via the pressure intensifying linear control valve 66 is normally performed and the control pressure sensor 73 has no abnormality but there is no variation in the measured value of the control pressure sensor 73. A possible cause of this case may be the presence of the closed failure of the separation valve 60 provided between the pressure intensifying linear control valve 66 and the control pressure sensor 73. After that, the brake ECU 70 ends the process shown in FIG. 7, and switches to the hydrobooster mode (S90 in FIG. 7).

On the other hand, if variations are detected in the measured value Pfr of the control pressure sensor 73 (NO at S100), the brake ECU 70 determines whether the measured value Pfr of the control pressure sensor 73 is rising (S114) as shown in FIG. 9. If the measured value Pfr continues rising (YES at S114), the brake ECU 70 determines that the amount of flow supplied from the pressure intensifying linear control valve 66 is abnormally low (S116). This determination is based on the following consideration. That is, as shown in FIG. 7, the process of step 92 is executed on the precondition that the retarded response abnormality is present (S84 in FIG. 7). Therefore, it is assumed that even though the measured value Pfr continues rising, the rise of the measured value Pfr should be slow, and therefore it should be difficult for the control hydraulic pressure Pfr to follow the target hydraulic pressure. Incidentally, the determination of low flow may be fixed after the presence of an abnormality is determined in the bad control abnormality determination (S86 in FIG. 7).

Referring back to FIG. 9, if the measured value Pfr of the control pressure sensor 73 is not rising (NO at S114), the control hydraulic pressure Pfr is considered to be in a state where the rising thereof has reached a limit. At this time, the brake ECU 70 stops the supply of the control electric current to the master cut valve 64 to open the master cut valve 64 (S118).

After the master cut valve 64 is opened, the brake ECU 70 determines whether or not there is a decrease in the measured value Pfr of the control pressure sensor 73 (S120). If the measured value Pfr does not decline (NO at S120), the brake ECU 70 determines that the master cut valve 64 has the open failure (S122). If the master cut valve 64 is normally open, it is considered that since the brake pedal 24 is not operated, the brake fluid ought to return to the master cylinder 32 resulting in a decline in the measured value Pfr of the control pressure sensor 73. However, the fact that there is no decline in the measured value Pfr despite the open state of the master cut valve 64 suggests that the master cut valve 64 has been open from the beginning. After that, the brake ECU 70 ends the process shown in FIG. 7, and switches to the hydrobooster mode (S90 in FIG. 7).

If the measured value Pfr of the control pressure sensor 73 declines (YES at S120), the brake ECU 70 closes the master cut valve 64, and opens the regulator cut valve 65 (S124). Then, the brake ECU 70 determines whether or not there is a decline in the measured value Pfr of the control pressure sensor 73 (S126). If the measured value Pfr does not decline (NO at S126), the brake ECU 70 determines that the regulator cut valve 65 has the open failure (S128). It is considered that, in such a case, too, the regulator cut valve 65 has an abnormality similar to the open failure of the master cut valve 64 mentioned above. After that, the brake ECU 70 ends the process shown in FIG. 7, and switches to the hydrobooster mode (S90 in FIG. 7).

In the case where the master cut valve 64 or the regulator cut valve 65 has the open failure as described above, the control hydraulic pressure Pfr is not stable; therefore, it is considered that the power hydraulic pressure source 30 may well be continuously driven in order to stabilize the control hydraulic pressure Pfr. Hence, continuous electrification of the motor 36a may be included as a condition for the brake ECU 70 to determine the presence of the open failure of the master cut valve 64 or the regulator cut valve 65. This is also applicable to other determination processes regarding the open failure or leakage abnormality.

If the measured value Pfr of the control pressure sensor 73 declines (YES at S126), the brake ECU 70 closes the regulator cut valve 65 (S130). Subsequently, the brake ECU 70 performs abnormality determination regarding the ABS pressure reducing valves 56 to 59, etc.

Firstly, the brake ECU 70 closes a specific one of the ABS retention valves 51 to 54, for example, the ABS retention valve 51 for the front right wheel (S132), and then determines whether or not there is a rise in the measured value Pfr of the control pressure sensor 73 (S134). If at this time, a rise in the measured value Pfr is observed (YES at S134), the brake ECU 70 determines that the open failure is present in the ABS pressure reducing valves 56 for the front right wheel corresponding to the closed ABS retention valves 51 for the front right wheel (S138). This is because the fact that the closure of a specific ABS retention valve with the rising of the measured value Pfr having reached a limit is followed by a re-rise in the measured value Pfr suggests that there is a brake fluid leakage downstream of that ABS retention valve. After that, the brake ECU 70 ends the process shown in FIG. 7, and switches to the hydrobooster mode (S90 in FIG. 7).

Incidentally, in this case, instead of the open failure of the ABS pressure reducing valve, there is a possibility of the brake fluid leaking from piping or the like connecting the hydraulic pressure actuator 40 and the wheel cylinder 23. If there is leakage from the piping, the amount of brake fluid that returns to the reservoir 34 decreases. Therefore, such leakage can be determined from the amount of brake fluid stored in the reservoir 34. Hence, the brake ECU 70 may discriminate the open failure of any one of the ABS pressure reducing valves and the piping leakage on the basis of a signal from a reservoir switch that detects the amount of brake fluid stored in the reservoir 34, or the like.

If the measured value Pfr of the control pressure sensor 73 does not rise after the closure of the ABS retention valve (NO at S134), the brake ECU 70 determines whether or not the determination as to the presence/absence of an abnormality of each of the ABS pressure reducing valves 56 to 59 has been completed (S136). If any of ABS pressure reducing valves 56 to 59 is left without determination having been made as to the presence/absence of an abnormality thereof (NO at S136), the brake ECU 70 closes the ABS retention valve 51 to 54 corresponding to a ABS pressure reducing valve (S132) in which the presence/absence of an abnormality as not been determined. In this manner, the brake ECU 70 repeatedly executes the same process for each one of the four wheels.

When it is determined that the determination has been completed on all the ABS pressure reducing valves 56 to 59 (YES at S136), the brake ECU 70 determines that the pressure reducing linear control valve 67 has the open failure (S140). This is the case where no rise in the control hydraulic pressure Pfr is observed as a result of the closure of any one of the ABS retention valves 51 to 54; therefore, it is considered that there is brake fluid leakage from the pressure reducing linear control valve 67. After that, the brake ECU 70 ends the process shown in FIG. 7, and switches to the hydrobooster mode (S90 in FIG. 7).

Figure 10:
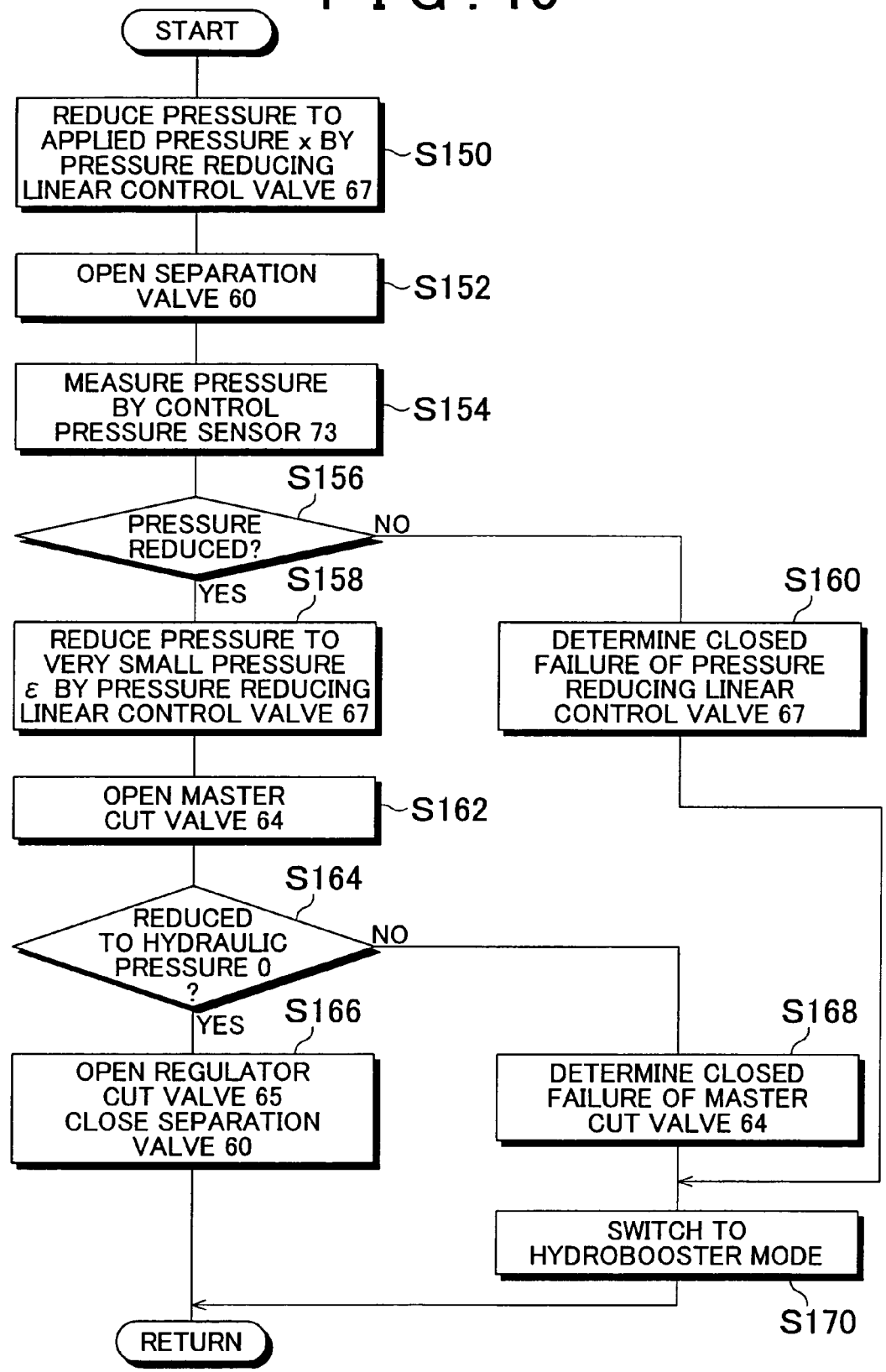
FIG. 10 is a flowchart for describing a leakage abnormality determination ending process in accordance with the embodiment.

FIG. 10 is a flowchart for describing a leakage abnormality determination ending process S78 shown in FIG. 6. As shown in FIG. 6, if the leakage abnormality determination time Ta elapses without detection of a leakage abnormality in the separation valve 60 (YES at S76), the brake ECU 70 executes the leakage abnormality determination ending process S78 described below.

When the leakage abnormality determination ending process S78 begins, the brake ECU 70 firstly controls the pressure reducing linear control valve 67 to reduce the control hydraulic pressure on the rear wheel side, that is, the hydraulic pressure in the second channel 45b of the main channel 45, to about the applied pressure x (S150). At this time, since the separation valve 60 is closed, the pressure is reduced not through a feedback control using the measured value Pfr provided by the control pressure sensor 73, but through a feedforward control of the control electric current supplied to the pressure reducing linear control valve 67. Hence, as for the pattern of the supply electric current to the pressure reducing linear control valve 67, a pattern that is capable of achieving smooth pressure reduction and that does not unnecessarily cause vibrations when the valve is opened may be empirically set.

When the hydraulic pressure on the rear wheel side is reduced to about the applied pressure x, the brake ECU 70 opens the separation valve 60 (S152). After opening the separation valve 60, the brake ECU 70 measures the control hydraulic pressure Pfr via the control pressure sensor 73 (S154). On the basis of the measured hydraulic pressure value, the brake ECU 70 determines whether or not the pressure reduction to the applied pressure x by the pressure reducing linear control valve 67 has been normally performed (S156). Since the separation valve 60 is opened after the pressure on the rear wheel side has been reduced to about the applied pressure x, the measured value Pfr of the control pressure sensor 73 provided on the front wheel side is maintained at about the applied pressure x, and does not vary provided that the pressure on the rear wheel side has been normally reduced. However, if the pressure has not been normally reduced, the measured value Pfr varies due to the influence of the hydraulic pressure on the rear wheel side. Hence, from the measured value Pfr of the control pressure sensor 73, it can be determined whether or not the pressure reduction to the applied pressure x has been normally performed.

If it is determined that the pressure has not been reduced (NO at S156), the brake ECU 70 determines that the pressure reducing linear control valve 67 has the closed failure (S160). This determination is based on the consideration that because the pressure reducing linear control valve 67 could not be opened, the pressure has not been reduced. After that, the brake ECU 70 switches to the hydrobooster mode (S170), ending the leakage abnormality determination ending process S78.

If it is determined that the pressure has normally been reduced (YES at S156), the brake ECU 70 further controls the pressure reducing linear control valve 67 to reduce the hydraulic pressure in the main channel 45 to a very small pressure $\epsilon$ (S158). Then, the brake ECU 70 stops the supply of the control electric current to the master cut valve 64 to open the master cut valve 64 (S162). In this state, the brake ECU 70 determines whether or not the hydraulic pressure in the main channel 45 has been reduced to zero, that is, to the atmospheric pressure, on the basis of the measured value Pfr of the control pressure sensor 73 (S164). If the master cut valve 64 is normally open, it can be considered that brake fluid returns to the master cylinder 32 via the master cut valve 64, so that the pressure further reduces from the very small pressure $\epsilon$. Hence, if it is determined that the pressure is not reduced to zero (NO at S164), the brake ECU 70 determines that the master cut valve 64 has the closed failure (S168). After that, the brake ECU 70 switches to the hydrobooster mode (S170), and the leakage abnormality determination ending process S78 ends. Incidentally, as for the very small pressure $\epsilon$, it is desirable to determine such a value thereof that the return of brake fluid to the master cylinder 32 causes the hydraulic pressure in the main channel 45 to be zero, beforehand through experiments or the like.

If it is determined that the hydraulic pressure has been reduced to zero (YES at S164), the brake ECU 70 opens the regulator cut valve 65, and closes the separation valve 60 (S166). Then, the process of step 56 shown in FIG. 6 ends. That is, each electromagnetic control valve is returned to the initial state as shown in FIG. 1, and the first abnormality determination process shown in FIG. 5 ends.

Figure 11:
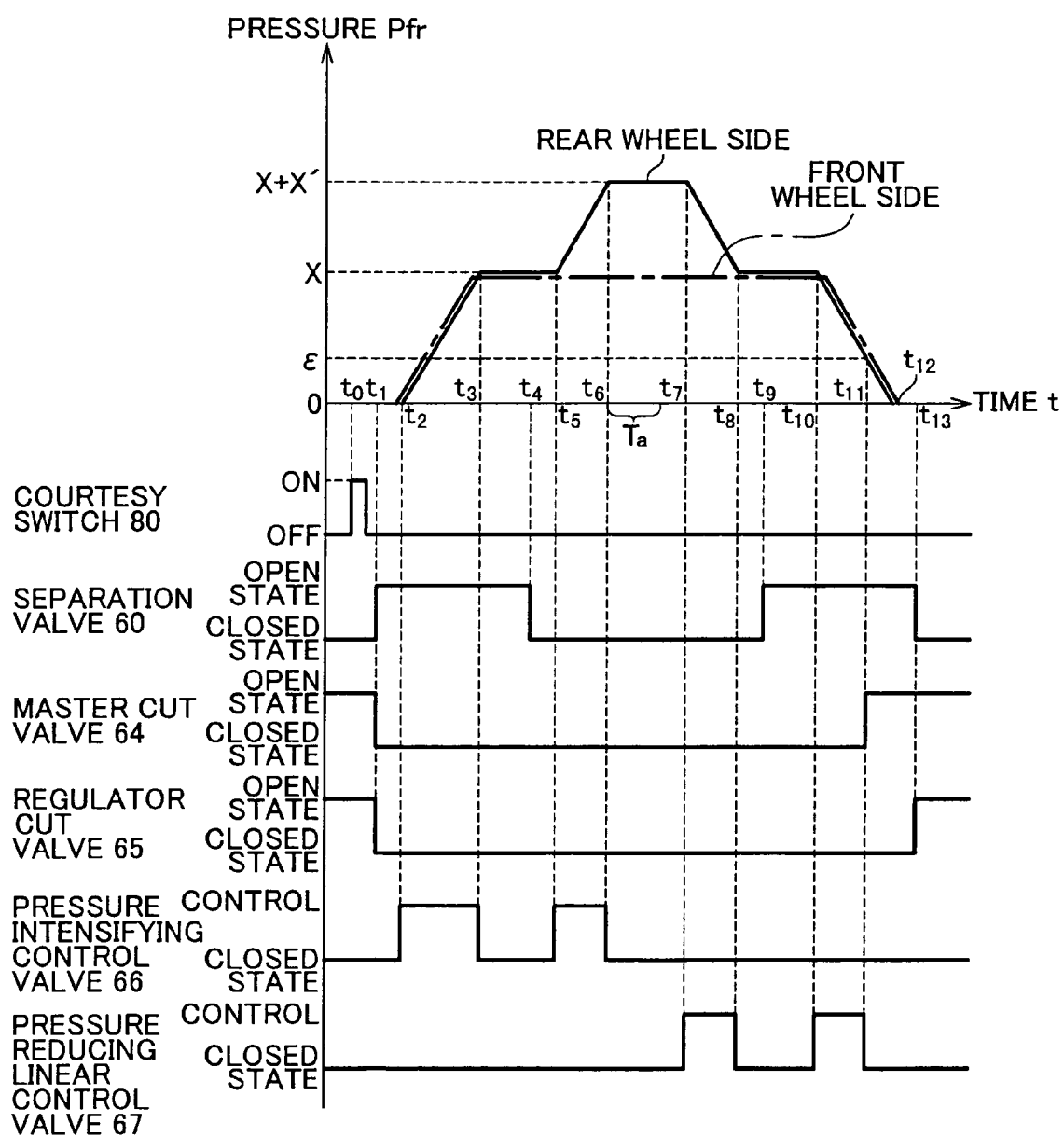
FIG. 11 is a diagram indicating the hydraulic pressure in a main channel and the opening/closing timings of various electromagnetic control valves at the time of the first abnormality determination process in accordance with the embodiment.

FIG. 11 is a diagram indicating the hydraulic pressure in the main channel 45 and the opening/closing timings of various electromagnetic control valves at the time of the first abnormality determination process. FIG. 11 shows the hydraulic pressure in the main channel 45 and the opening/closing timings of various electromagnetic control valves in the case where no abnormality has been detected by the first abnormality determination process shown in FIGS. 5 to 10. In an upper portion of FIG. 11, pressure variations on the front wheel side and the rear wheel side are shown by a one-dot chain line and a solid line, respectively. In a lower portion of FIG. 11, the states of the courtesy switch 80 and the various electromagnetic control valves are shown in the sequence of the courtesy switch 80, the separation valve 60, the master cut valve 64, the regulator cut valve 65, the pressure intensifying linear control valve 66, and the pressure reducing linear control valve 67, from above.

When the door of the vehicle is opened by an occupant at a time $t_0$, the ON signal is output by the courtesy switch 80, and is input to the brake ECU 70, so that the first abnormality determination process begins. At a time $t_1$ that is a little later than the time $t_0$, the brake ECU 70 supplies a control electric current to each of the separation valve 60, the master cut valve 64, and the regulator cut valve 65 to open the separation valve 60 and close the master cut valve 64 and the regulator cut valve 65 (S60 in FIG. 6). Next, at a time $t_2$ slightly later than the time $t_1$, the brake ECU 70 begins the supply of the control electric current to the pressure intensifying linear control valve 66, and controls the pressure intensifying linear control valve 66 until a time $t_3$ when the control hydraulic pressure Pfr measured by the control pressure sensor 73 becomes equal to the applied pressure x (S80 at FIG. 7). In the embodiment, the applied pressure x is, for example, about 2 to 3 MPa. Then, within a predetermined time after the control hydraulic pressure Pfr becomes equal to the applied pressure x, the process of step 62 is completed (S62 at FIG. 6). At a time $t_4$ following the completion of the process of step 62, the brake ECU 70 closes the separation valve 60 (S64 at FIG. 6).

Subsequently, at a time $t_5$ after a predetermined delay time from the time $t_4$ has elapsed, the brake ECU 70 controls the pressure intensifying linear control valve 66 again so as to intensify the pressure on the rear wheel side (S66 at FIG. 6). After that, when the differential pressure across the separation valve 60 reaches a predetermined differential pressure x' at a time $t_6$, the brake ECU 70 stops controlling the pressure intensifying linear control valve 66 and closes the pressure intensifying linear control valve 66. Then, the brake ECU 70 determines the presence/absence of a leakage abnormality of the separation valve 60 by taking a leakage abnormality determination time Ta (S70 and S76 at FIG. 6). Although an increase of the differential pressure x' improves the accuracy of abnormality determination, it also increases the time required for the pressure intensification. Therefore, the differential pressure x' may be appropriately determined through experiments or the like. In this embodiment, the differential pressure x' is set at, for example, about 2 to 3 MPa.

As described above, in this embodiment, the applied pressure x is provided on the two sides of the separation valve 60 beforehand, and the rear wheel-side pressure is intensified to create a differential pressure with respect to the front wheel side. If the pressure intensifying linear control valve 66 is operated to intensify the pressure without the applied pressure given, the hydraulic pressure less easily increases for the amount of fluid consumed during an initial period of the pressure intensification, due to the influence of the elasticities of the piping, the wheel cylinders 23, etc. Then, after the hydraulic pressure is intensified to some extent, the variation in the hydraulic pressure, even for small changes in the amount of fuel consumed, becomes larger during the initial period of the pressure intensification. Hence, if the applied pressure x is provided as in this embodiment, it is possible to increase the variation in the differential pressure across the separation valve 60 associated with the passage of brake fluid due to the leakage abnormality. Therefore, by proving the applied pressure x beforehand, it becomes possible to determine the leakage abnormality of the separation valve 60 with higher accuracy.

During the period of a time $t_7$ to a time $t_8$ which follows a predetermined delay time after the elapse of the leakage abnormality determination time Ta, the brake ECU 70 controls the pressure reducing linear control valve 67 to reduce the control hydraulic pressure on the rear wheel side to about the applied pressure x (S150 in FIG. 10). Then, at a time $t_9$ after a predetermined delay time, the brake ECU 70 opens the separation valve 60 (S152 in FIG. 10).

Within a predetermined time following the opening of the separation valve 60, the brake ECU 70 determines whether or not the pressure has been normally reduced (S156 in FIG. 10). Then, on the precondition that the pressure has been normally reduced, the brake ECU 70 begins to control the pressure reducing linear control valve 67 again at a time $t_{10}$. At a time $t_{11}$ when the control hydraulic pressure reaches the very small pressure $\epsilon$, the brake ECU 70 opens the master cut valve 64 (S162 in FIG. 10). Substantially simultaneously with the opening of the master cut valve 64, the brake ECU 70 stops controlling the pressure reducing linear control valve 67 and closes the valve 67. In this embodiment, the pressure $\epsilon$ is set at, for example, about 0.5 to 1 MPa. After being further reduced, the control hydraulic pressure reaches the atmospheric pressure at a time $t_{12}$. Then, at a time $t_{13}$ after a predetermined time delay, the brake ECU 70 opens the regulator cut valve 65 to, and closes the separation valve 60 (S166 in FIG. 10). Then, the first abnormality determination process ends.

In this embodiment, the brake ECU 70 eliminates the differential pressure in the main channel 45 by opening the separation valve 60, before the brake ECU 70 opens the master cut valve 64 and the regulator cut valve 65. Hence, the pedal shock when the master cut valve 64 or the regulator cut valve 65 is opened can be reduced.

In the embodiment, if a brake operation performed by a driver is detected before the process of step 56 is completed, the brake ECU 70 interrupts that process. This is because there is a need to change the opening/closing pattern of electromagnetic open/close valve so as to generate braking force in accordance with the brake operation.

If the process of step 56 is interrupted while there is a differential pressure across the separation valve 60, the brake ECU 70 may stop the supply of the control electric current to the master cut valve 64 or the regulator cut valve 65 and open the valve after eliminating the differential pressure. This is intended to restrain the occurrence of pedal shock due to the differential pressure when the master cut valve 64 or the regulator cut valve 65 is opened. In order to eliminate the differential pressure, the brake ECU 70 opens the separation valve 60. After opening the separation valve 60, the brake ECU 70 may also reduce the hydraulic pressure in the main channel 45 to about the level of the master cylinder pressure through the use of the pressure reducing linear control valve 67. Or, the brake ECU 70 may simply open any one of the ABS pressure reducing valves 56 to 59 to reduce the hydraulic pressure in the main channel 45.

After the differential pressure across the separation valve 60 is eliminated, the brake ECU 70 stops the supply of the control electric current to the separation valve 60, thus closing the valve. Then, the brake ECU 70 stops the supply of the control electric current to the master cut valve 64 and the regulator cut valve 65, thus opening them. In this manner, the brake control apparatus 20 is returned to the initial state as shown in FIG. 1.

If the process of step 56 is interrupted, it is desirable to store the results of determination made up to the time of the interruption, into the brake ECU 70. Thus, the results of determination can be utilized for the processes that follow. For example, the results of determination up to the interruption may be used as a basis for switching the control mode to the hydrobooster mode. In addition, after the process of step 56 is resumed, the process can be completed merely by performing only the determination processes that are not completed.

In this embodiment, if the driver starts up the running drive source of the vehicle after the first abnormality determination process ends, a second abnormality determination process is executed. More concretely, the second abnormality determination process is executed while the driver's depression of the brake pedal 24 for starting up the running drive source of the vehicle continues after the running drive source has been started up. In other words, the second abnormality determination process is executed during that period of the initial brake pedal depression, which lasts from the engine startup to the beginning of running of the vehicle. According to the second abnormality determination process, it is determined whether or not the brake fluid pressurized in accordance with the driver's brake operation amount is normally supplied from the regulator 33 to the wheel cylinders 23. The brake ECU 70 begins the second abnormality determination process, upon detecting the startup of the running drive source of the vehicle and depression of the brake pedal 24.

Figure 12:
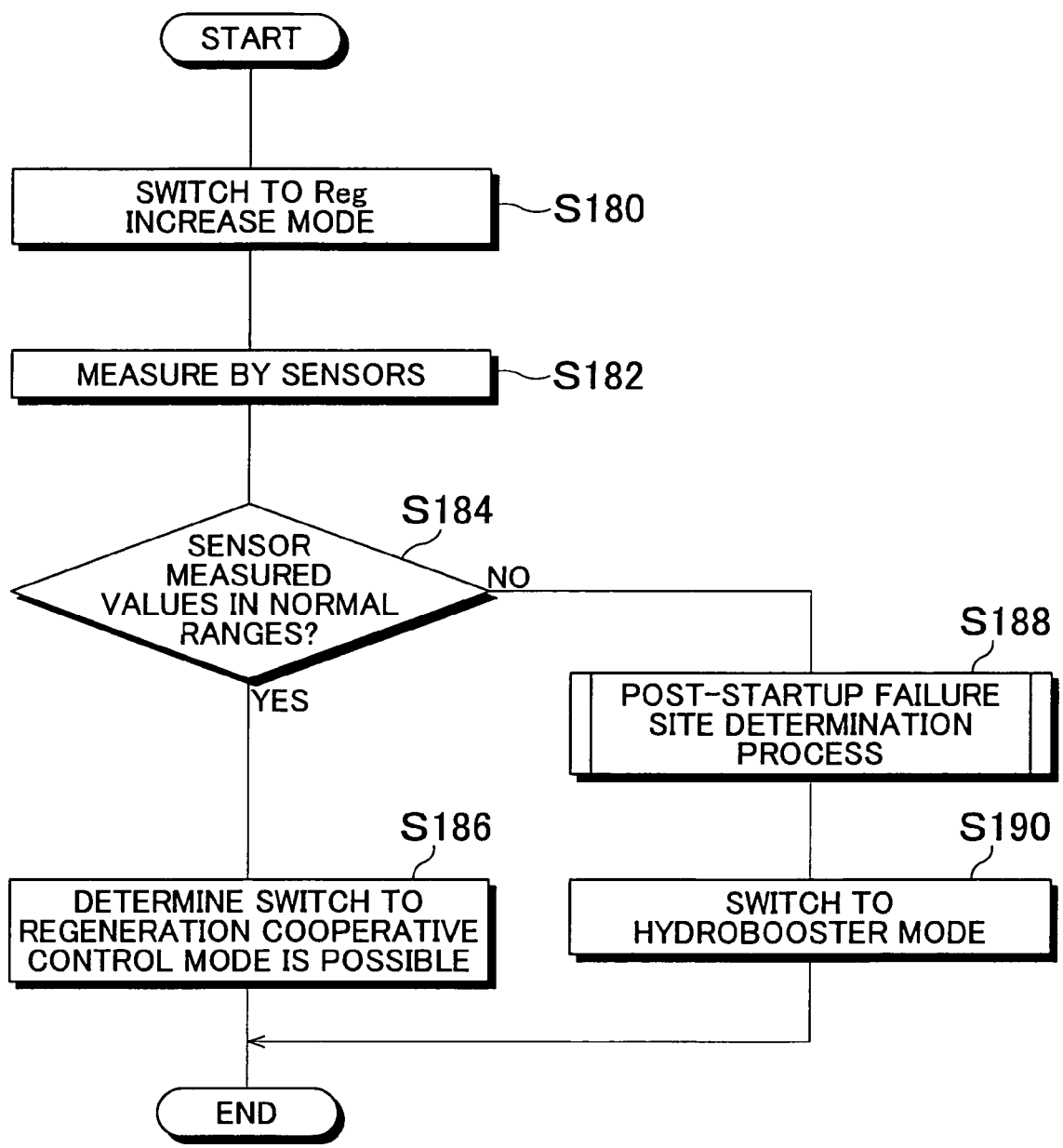
FIG. 12 is a flowchart for describing a second abnormality determination process in the embodiment.

FIG. 12 is a flowchart for describing the second abnormality determination process in this embodiment. When the second abnormality determination process begins, the brake ECU 70 switches the control mode to the Reg increase mode (S180). After switching to the Reg increase mode, the brake ECU 70 acquires measured values from various sensors, that is, the control pressure sensor 73, the regulator pressure sensor 71, and the stroke sensor 25 (S182). Then, the brake ECU 70 compares the measured values acquired from the sensors to determine whether or not each measured value is within a normal range (S184).

Figure 13:
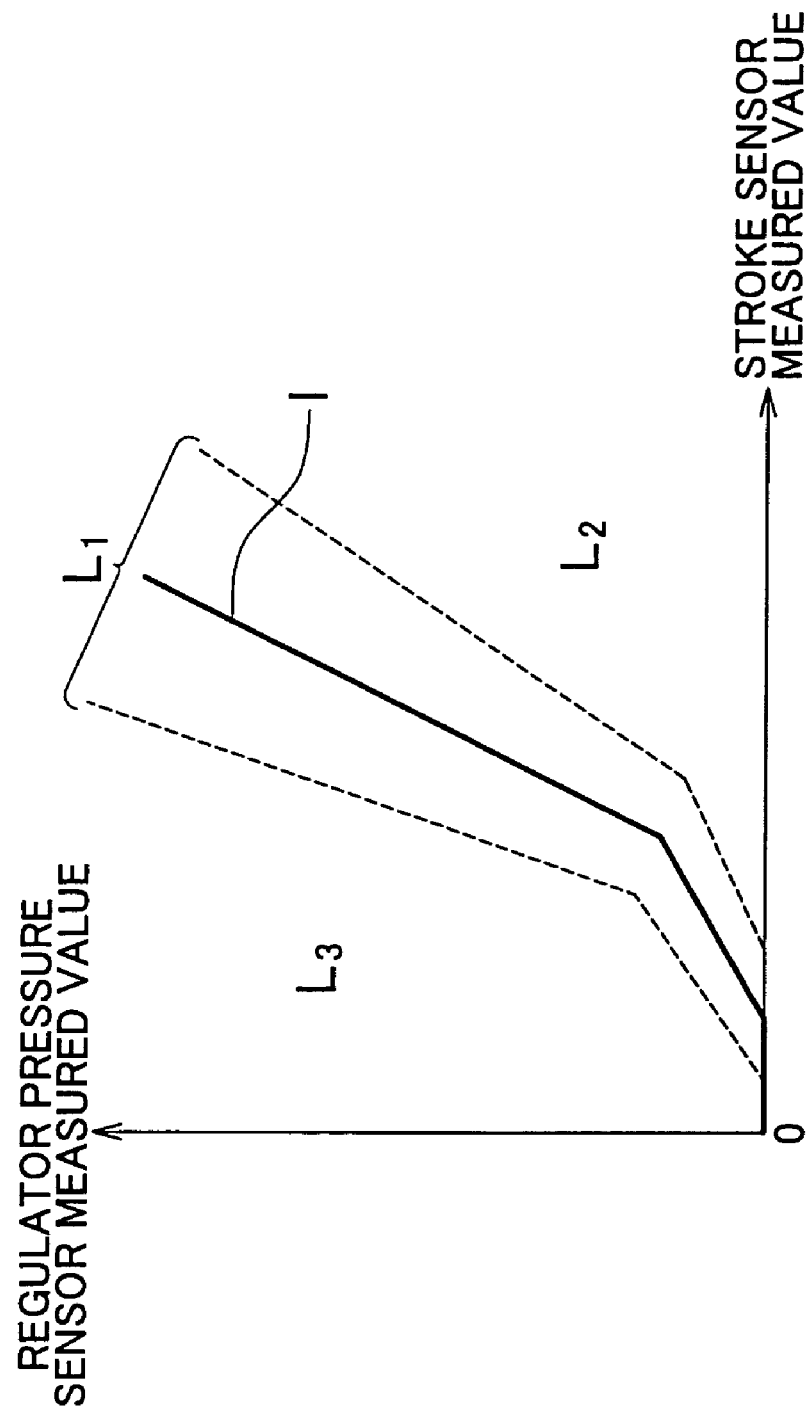
FIG. 13 is a graph for determining whether or not the measured values of sensors are in a normal range in accordance with the embodiment.
Figure 14:
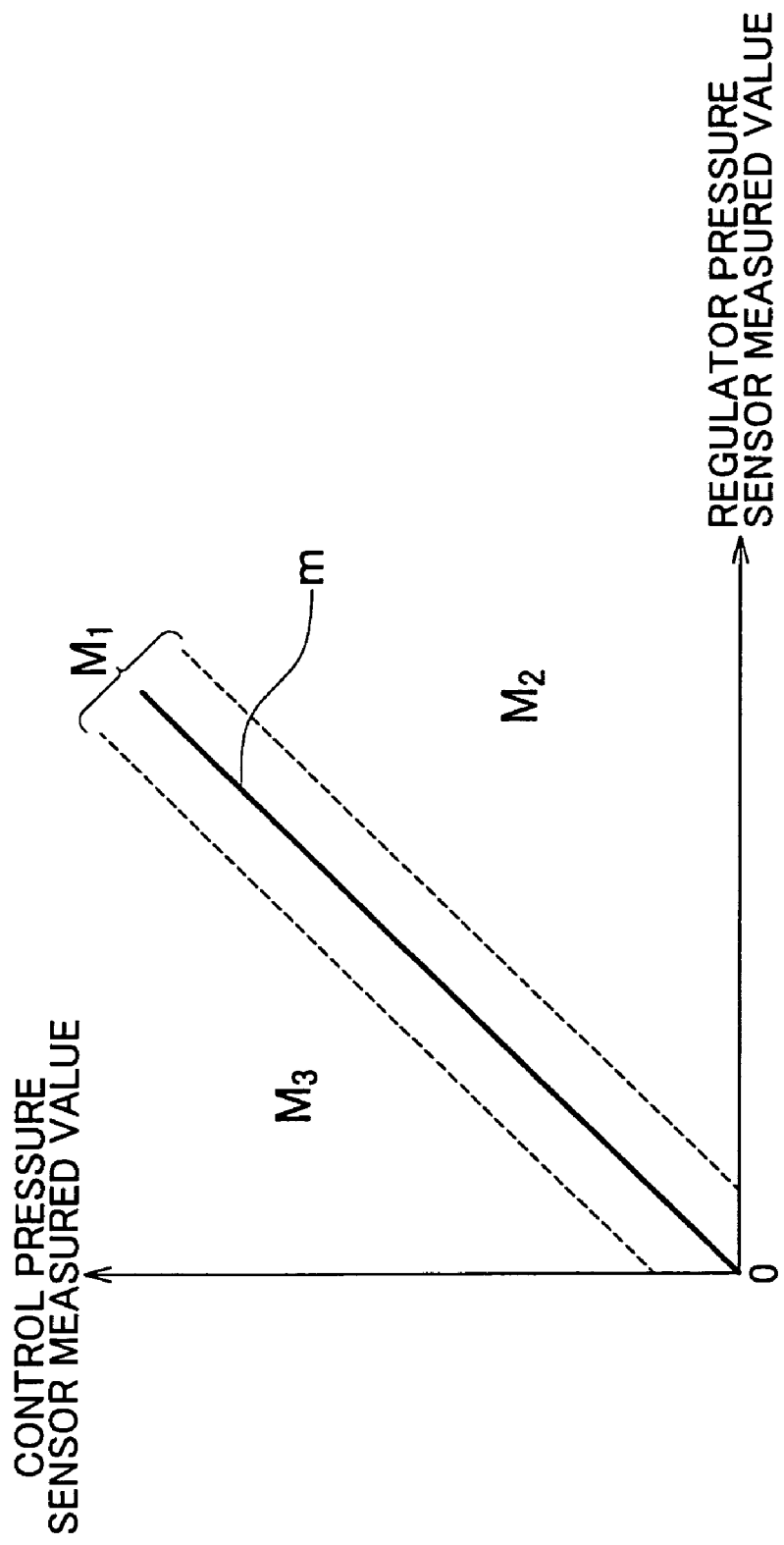
FIG. 14 is a graph for determining whether or not the measured values of sensors are in a normal range in accordance with the embodiment.

Here, the method of determination at S184 will be described with reference to FIGS. 13 and 14. FIGS. 13 and 14 are graphs for determining whether or not the measured values of sensors are within normal ranges. In FIG. 13, the vertical axis represents the measured value of the regulator pressure sensor 71, and the horizontal axis represents the measured value of the stroke sensor 25. In FIG. 14, the vertical axis represents the measured value of the control pressure sensor 73, and the horizontal axis represents measured value of the regulator pressure sensor 71. The graphs shown in FIGS. 13 and 14 are set beforehand and stored in the brake ECU 70.

The brake ECU 70 determines whether or not the measured values are normal on the basis of their positions in the graph of FIG. 13 or 14. Concretely, it is determined that measured values are normal if the measured values are in a region $L_1$ or a region $M_1$ sandwiched between two broken lines in FIG. 13 or FIG. 14. Otherwise, it is determined that measured values are not normal.

The region $L_1$ shown in FIG. 13 is set so as to include a bent line 1 shown by a solid line in FIG. 13. The bent line 1 corresponds to the relationship between the measured value of the stroke sensor 25 and the measured value of the regulator pressure sensor 71 in the case where the brake control apparatus 20 is normal. The broken lines in FIG. 13 are set as threshold values for determining whether or not the measurements are normal, and are set in both sides of the bent line 1 so as to have predetermined intervals from the bent line 1. A reason why the relationship in the case of normality takes the form of a bent line is that during an initial period of pressure intensification when the stroke value is small, the amount of pressure intensification is absorbed to some extent by the elastic deformation of the brake fluid piping and the like, and therefore the pressure is less readily increased.

Hence, if the measured stroke value and the measured regulator pressure are included in the region $L_1$ shown as a region sandwiched between the broken lines in FIG. 13, the brake ECU 70 can determine that the relationship between the stroke value and the regulator pressure is normal. Conversely, if the stroke value and the regulator pressure are not included in the region $L_1$, the brake ECU 70 can determine that the relationship between the stroke value and the regulator pressure is not normal.

Incidentally, the regions for the determination that the relationship therebetween is not normal are appropriately termed in the following description, that is, the region below the region $L_1$ is termed region $L_2$, and the region above the region $L_1$ is termed region $L_3$. The region $L_2$ corresponds to the case where the regulator pressure is excessively small for the stroke value. On the other hand, the region $L_3$ corresponds to the case where the regulator pressure is excessively large for the stroke value.

The region $M_1$ shown in FIG. 14 is set so as to include a straight line m shown by a solid line in FIG. 14. The straight line m indicates the relationship between the measured value of the control pressure sensor 73 and the measured value of the regulator pressure sensor 71 in the case where the brake control apparatus 20 is normal. The broken lines in FIG. 14 are set as threshold values for determining whether or not the measurements are normal, and are set in both sides of the straight line m so as to have predetermined intervals from the straight line m. Incidentally, the straight line m passes through points where the measured value of the control pressure sensor 73 and the measured value of the regulator pressure sensor 71 are equal. This is explained as follows. Since the determination is performed in the Reg increase mode where the regulator cut valve 65 and the separation valve 60 are open, equal hydraulic pressures act on the control pressure sensor 73 and the regulator pressure sensor 71 in the case of normality. Incidentally, this method of determination can also be adopted in the hydrobooster mode where the separation valve 60 is closed. In such a case, the region $M_1$ may be set wider to a certain extent.

Hence, if the control pressure and the regulator pressure are included in the region $M_1$ shown as a region sandwiched between the broken lines in FIG. 14, the brake ECU 70 can determine that the relationship between the control pressure and the regulator pressure is normal. If not, the brake ECU 70 can determine that the relationship therebetween is not normal. Incidentally, the regions for the determination that the relationship therebetween is not normal are appropriately termed in the following description, that is, the region below the region M₁ is termed region M₂, and the region above the region M₁ is termed region M₃.

Referring back to FIG. 12, the description of the second abnormality determination process will be continued. If it is determined by the above-described determination method that the measured values of the sensors are in the normal ranges (YES at S184), the brake ECU 70 determines that it is possible to switch to the regeneration cooperative control mode (S186), and then ends the second abnormality determination process. Therefore, it becomes possible to execute the regeneration cooperative control from the time of the first braking performed after the startup of the running drive source of the vehicle. On the other hand, if it is determined that the measured values of sensors are not in a normal range (NO at S184), the brake ECU 70 executes a post-startup failure site determination process (hereinafter, simply referred to as "process of step 188") in order to distinguish a site of occurrence of an abnormality (S188).

In the process of step 188, distinction of failure sites at portions or locations other than the sensors is performed in the following two cases. The first case is a case where the regulator pressure and the control hydraulic pressure Pfr are excessively small for the stroke value. This is the case where the measured values of the sensors are respectively included in the region L₂ (see FIG. 13) and the region M₁ (see FIG. 14). A reason why the hydraulic pressure is low for the stroke value is considered to be the presence of leakage of brake fluid. The second case is a case where although the relationship between the stroke value and the regulator pressure is in the normal range, substantially no variation is observed in the measured value of the control pressure sensor 73. A reason for this is considered to be that the regulator pressure sensor 71 and the control pressure sensor 73 are shut off from each other due to the closed failure of a valve. Apart from these two cases, it is considered that the measured value a sensor is abnormal because of the presence of an abnormality in the sensor.

Figure 15:
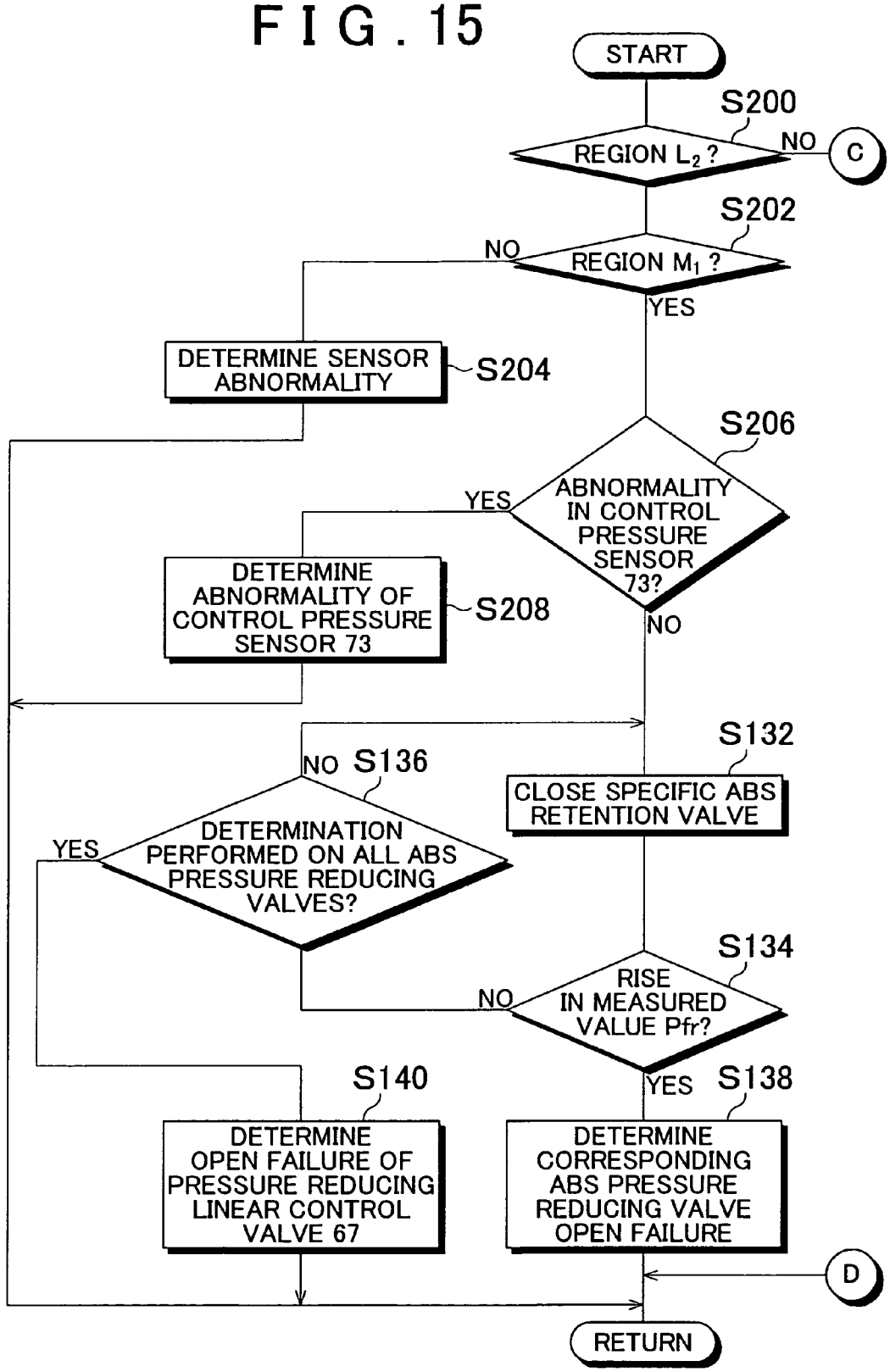
FIG. 15 is a flowchart for describing a post-startup failure site determination process in accordance with the embodiment.
Figure 16:
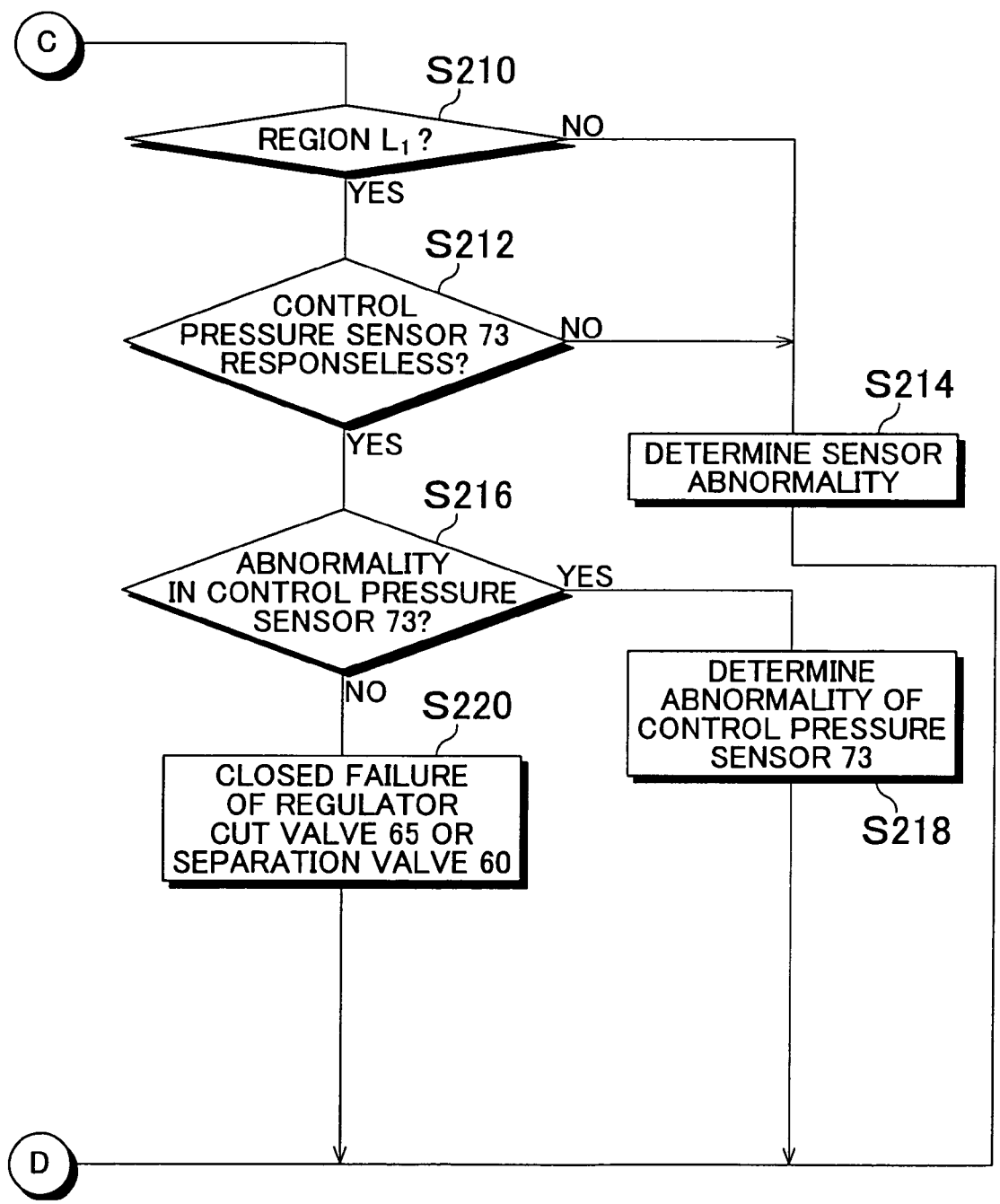
FIG. 16 is a flowchart for describing the post-startup failure site determination process in accordance with the embodiment.

FIGS. 15 and 16 are a flowchart for describing the process of step 188 in this embodiment. When the process of step 188 begins, the brake ECU 70 determines whether or not the measured stroke value and the measured regulator pressure are in the region L₂ (see FIG. 13) (S200). If they are in the region L₂ (YES at S200), the brake ECU 70 further determines whether or not the measured control hydraulic pressure Pfr and the measured regulator pressure are in the region M₁ (see FIG. 14) (S202). If it is determined that they are not included in the region M₁ (NO at S202), the brake ECU 70 determines that at least one of the sensors has an abnormality (S204), and ends the process of step 188.

If it is determined that the control hydraulic pressure Pfr and the regulator pressure are included in the region M₁ (YES at S202), the brake ECU 70 causes the control pressure sensor 73 to perform self-diagnosis, and determines whether or not the control pressure sensor 73 has an abnormality (S206). If a result of the self-diagnosis of the control pressure sensor 73 suggests the presence of an abnormality (YES at S206), the brake ECU 70 determines that the control pressure sensor 73 has an abnormality (S208), and ends the process of step 188.

If the result of the self-diagnosis of the control pressure sensor 73 does not suggest the presence of an abnormality (NO at S206), this case corresponds to the aforementioned first case, and therefore the brake ECU 70 further executes a process of distinguishing the site where brake fluid leakage is present. This process may be executed in substantially the same manner as the process of S132 to S140 described above with reference to FIG. 9. However, in this embodiment, since equal hydraulic pressures act on the regulator pressure sensor 71 and the control pressure sensor 73, the determination may be performed in S134 on the basis of the regulator pressure. After the site where brake fluid leakage is present is distinguished, the brake ECU 70 ends the process of step 188.

On the other hand, if the stroke value and the regulator pressure are not included in the region L₂ (NO at S200), the brake ECU 70 further determines, as shown in FIG. 16, whether or not the stroke value and the regulator pressure are in the region L₁ (see FIG. 13) (S210). If it is determined that they are not included in the region L₁ (NO at S210), the brake ECU 70 determines that at least one of the sensors has an abnormality (S214), and ends the process of step 188.

If the stroke value and the regulator pressure are included in the region L₁ (YES at S210), the brake ECU 70 further determines whether or not a change is observed in the measured value of the control pressure sensor 73 (S212). If it is not determined that the measured value of the control pressure sensor 73 does not change or the control pressure sensor 74 is other non-responsive (NO at S212), the brake ECU 70 determines that at least one of the sensors has an abnormality (S214), and ends the process of step 188.

If it is determined that the measured value of the control pressure sensor 73 does not change or the control pressure sensor 73 is other non-responsive (YES at S212), the brake ECU 70 causes the control pressure sensor 73 to perform self-diagnosis, and determines whether or not the control pressure sensor 73 has an abnormality (S216). If a result of the self-diagnosis of the control pressure sensor 73 suggests the presence of an abnormality (YES at S216), the brake ECU 70 determines that the control pressure sensor 73 has an abnormality (S218), and ends the process of step 188.

If the result of the self-diagnosis of the control pressure sensor 73 does not suggest the presence of an abnormality (NO at S216), this case corresponds to the aforementioned second case, and the brake ECU 70 determines that the regulator cut valve 65 or the separation valve 60 has the closed failure (S220), and ends the process of step 188.

As shown in FIG. 12, after the process of step 188 ends, the brake ECU 70 switches to the hydrobooster mode (S190), and ends the second abnormality determination process. Incidentally, the sensor assay process S36 shown in FIG. 2 may also be performed in substantially the same manner as the second abnormality determination process described above with reference to FIGS. 12 to 16.

However, in this embodiment, in the case where the process of step 56 prior to the startup of the engine has been interrupted, this process is resumed during the continuation of the brake operation after the above-described second abnormality determination process ends. In this case, instead of the applied pressure x, the depression pressure provided by brake operation is used.

Then, if the process of step 56 is completed without any abnormality detected before the brake operation ends, the brake ECU 70 determines that the control mode can be switched to the regeneration cooperative control mode. The brake ECU 70 also determines that the control mode can be switched to the regeneration cooperative control mode, in the case where the process is interrupted again without an abnormality detected. In the case where the process is interrupted again, the brake ECU 70 resumes the process of step 56 and completes the process while the vehicle is at a stop during the control in the regeneration cooperative control mode. In any case, the brake ECU 70 will switch to the hydrobooster mode should an abnormality be detected.

Furthermore, there are cases where the execution of the first abnormality determination process upon the output signal of the courtesy switch is not possible, for example, where a driver, after taking a nap in the vehicle, suddenly starts up the vehicle without opening or closing a door. In such cases, the brake ECU 70 first sets the control mode to the Reg increase mode. Then, the brake ECU 70 executes the second abnormality determination process during the brake operation after the vehicle is started up, and also executes the process of step 56. If the process of step 56 is interrupted due to the end of the brake operation or the like, the brake ECU 70 resumes the process at the time of the next brake operation, preferably while the vehicle is at a stop.

Incidentally, the cases where the execution of the first abnormality determination process upon the output signal of the courtesy switch is not possible include cases where the brake ECU 70 should not set the control mode to the Reg increase mode, for example, the case where the accumulator pressure has not reached a sufficient pressure accumulated state. In such cases, the brake ECU 70 may first set the control mode to the hydrobooster mode. Then, after the accumulator pressure is raised to a predetermined pressure, the brake ECU 70 may switch the control mode to the Reg increase mode to execute the second abnormality determination process and the process of step 56 as described above.

As in the foregoing description, the apparatus according to the embodiment detects an abnormality of any one of main elements that constitute the brake control apparatus 20, for instance, the separation valve 60, and the like, before the running drive source is started up. This abnormality detection is performed upon the input of a ride-related signal into the brake ECU 70, so that an abnormality can be detected immediately before the running drive source is started up. Furthermore, at the time of the brake operation associated with the startup of the running drive source, abnormality detection is performed with respect to main elements provided for transfer of the regulator pressure to the wheel cylinders 23. If an abnormality is detected, the brake ECU 70 switches the control mode to the hydrobooster mode. If no abnormality is detected, the brake ECU 70 determines that it is possible to switch to the regeneration cooperative control mode. Therefore, it is possible to realize a fail-safe operation by detecting an abnormality prior to running of the vehicle. In the case of normality, the control mode can be promptly switched to the regeneration cooperative control mode to execute the regeneration cooperative control from the time of the first braking performed after the startup of the running drive source.

Furthermore, in this embodiment, at the time of determination as to the leakage abnormality of the separation valve 60, the master cut valve 64 and the regulator cut valve 65 are closed so that the differential pressure will not be varied by a factor other than the leakage abnormality. The master cut valve 64 and the regulator cut valve 65 are initially open. Therefore, in order to close the two valves, it is necessary to supply the control electric current to close the valves. Then, when the leakage abnormality determination ends, the two valves are opened. If such a valve-closing or opening operation is performed during a driver's brake operation, the pedal feel to the driver will be greatly affected. In this embodiment, the opening/closure of the valves is performed while the brake operation is not performed by the driver. Therefore, it is possible to detect an abnormality without causing the driver to perceive an unpleasant pedal feel. Furthermore, the interrupted process of step 56 is resumed in the Reg increase mode. Therefore, the process of step 56 is resumed while the regulator cut valve 65 is kept open, and the master cut valve 64 is kept closed. Hence, the influence on the pedal feel is restrained in the case of resumption of the process of step 56 as well.

Furthermore, in the embodiment, a plurality of hydraulic pressure sources may be provided in parallel for the wheel cylinders 23 in the light of improvement of the controllability of the control hydraulic pressure for the braking force, or the like. That is, the power hydraulic pressure source 30, the master cylinder 32, and the regulator 33 may be provided in parallel to each of the wheel cylinders 23. Furthermore, the hydraulic pressure circuit in which the master cylinder pressure and the regulator pressure substantially equal thereto are act respectively on the two sides of the separation valve 60 is adopted. Therefore, the brake operation does not immediately cause differential pressure across the separation valve 60. However, in the embodiment, various electromagnetically opening/closing valves are operated in the above-described opening/closing patterns so that differential pressure acts across the separation valve 60 due to the hydraulic pressure accumulated in the power hydraulic pressure source 30. Therefore, even though the brake operation does not immediately cause differential pressure across the separation valve 60, it is possible to detect the leakage abnormality of the separation valve 60.

What is claimed is:

1. A brake control apparatus comprising:
    a first wheel cylinder that applies braking force to a first wheel;
    a second wheel cylinder that applies the braking force to a second wheel that is different from the first wheel;
    a manual hydraulic pressure source that pressurizes a working fluid in accordance with an amount of operation of a brake operating member;
    a first system that communicably connects the manual hydraulic pressure source and the first wheel cylinder, and that transfers working fluid pressure in the manual hydraulic pressure source to the first wheel cylinder;
    a second system that communicably connects the manual hydraulic pressure source and the second wheel cylinder, and that transfers the working fluid pressure in the manual hydraulic pressure source to the second wheel cylinder;
    a main channel that communicably connects the first system and the second system;
    a separation valve provided in the main channel;
    a pressure control mechanism that controls the working fluid pressure transferred to at least one of the first wheel cylinder and the second wheel cylinder independently of the amount of operation of the brake operating member; and
    a control device that, when the brake operating member is not operated and the separation valve is closed while a running drive source of a vehicle is stopped, actuates the pressure control mechanism and determines whether the separation valve has an abnormality based on a change in pressure difference between an upstream side and a downstream side of the separation valve.

2. The brake control apparatus according to claim 1, wherein, when the control device receives a signal indicating entry of an occupant into the vehicle, the control device determines whether the separation valve has an abnormality.

3. The brake control apparatus according to claim 1, wherein the pressure control mechanism includes:
    a power hydraulic pressure source that delivers the working fluid pressurized due to supply of power, independently of the operation of the brake operating member,
    a pressure-intensifying control valve provided downstream of the power hydraulic pressure source, and
    a pressure-reducing control valve, provided downstream of the pressure-intensifying control valve, the main channel being communicably connected between the pressure-intensifying control valve and the pressure-reducing control valve.

4. The brake control apparatus according to claim 1, wherein, before determining whether the separation valve has an abnormality, the control device determines whether the pressure difference is normally generated.

5. The brake control apparatus according to claim 4, wherein the control device determines whether the pressure difference is normally generated based on a response of the working fluid pressure on the separation valve caused when a predetermined pressure is applied to the separation valve by operating the pressure control mechanism.

6. The brake control apparatus according to claim 1, wherein the control device generates the pressure difference by applying a predetermined pressure to the open separation valve, then closing the separation valve, and operating the pressure control mechanism to intensify pressure on one of the upstream side and the downstream side of the separation valve.

7. The brake control apparatus according to claim 3, further comprising:
a pressure sensor that measures the working fluid pressure in the main channel,
wherein the first system includes a first cut valve provided between the manual hydraulic pressure source and the main channel,
wherein the second system includes a second cut valve provided between the manual hydraulic pressure source and the main channel, and
wherein the control device closes the first and second cut valves and opens the separation valve, and operates the pressure-intensifying control valve to supply the working fluid to the main channel, and determines whether any one of the first cut valve, the second cut valve, the pressure-intensifying control valve, and pressure-reducing control valve has an abnormality based on the working fluid pressure in the main channel measured by the pressure sensor.

8. The brake control apparatus according to claim 7, wherein the control device closes the first cut valve, the second cut valve, and the separation valve, and operates the pressure control mechanism to generate the pressure difference, and determines whether the separation valve has an abnormality based on the working fluid pressure in the main channel measured by the pressure sensor.

9. The brake control apparatus according to claim 8, wherein the control device eliminates the pressure difference after abnormality determination regarding the separation valve, and opens at least one of the first cut valve and the second cut valve after the pressure difference is eliminated.

10. The brake control apparatus according to claim 1, wherein, before the vehicle begins to run, the control device determines whether the working fluid pressure, in accordance with the amount of operation of the brake operating member, is transferred to the first and second wheel cylinders.

11. The brake control apparatus according to claim 10, further comprising:
a first pressure sensor that measures the working fluid pressure in the main channel;
a second pressure sensor that measures the working fluid pressure in the manual hydraulic pressure source; and
a brake operation amount sensor that measures the amount of operation of the brake operating member,
wherein the first system includes a first cut valve provided between the manual hydraulic pressure source and the main channel,
wherein the second system includes a second cut valve provided between the manual hydraulic pressure source and the main channel, and
wherein the control device closes the second cut valve, opens the first cut valve and the separation valve, and acquires measured values of: the first pressure sensor, the second pressure sensor, and the brake operation amount sensor, and determines whether the working fluid pressure, in accordance with the amount of operation of the brake operating member, is normally transferred to the first and second wheel cylinders based on the measured values.

12. The brake control apparatus according to claim 11, wherein the control device determines whether at least one of the first pressure sensor, the second pressure sensor, and the brake operation amount sensor has an abnormality based on the measured values.

13. The brake control apparatus according to claim 1, wherein the control device determines whether the separation valve has a leakage abnormality based on a change in the pressure difference.

14. A brake control method comprising:
closing a separation valve, provided in a main channel communicably connecting a first system, which transfers working fluid pressure from a manual hydraulic pressure source that pressurizes a working fluid, in accordance with an amount of operation of a brake operating member, to a first wheel cylinder provided for applying braking force to a first wheel, and a second system, which transfers the working fluid pressure from the manual hydraulic pressure source to a second wheel cylinder provided for applying the braking force to a second wheel;
operating a pressure control mechanism when the brake operating member is not operated while a running drive source of a vehicle is stopped; and
determining whether the separation valve has an abnormality based on a change in pressure difference between an upstream side and a downstream side of the separation valve.

15. The brake control apparatus according to claim 2, wherein the signal indicating entry of an occupant into the vehicle is output from a courtesy switch that detects the opening or closure of a door of the vehicle.

* * * * *